(12) United States Patent
Kumar et al.

(10) Patent No.: US 12,245,037 B2
(45) Date of Patent: Mar. 4, 2025

(54) IMPLEMENTING CONFIDENCE METRICS IN VEHICLE-TO-EVERYTHING (V2X) COMMUNICATIONS

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/490,803

(22) Filed: Sep. 30, 2021

(65) Prior Publication Data

US 2023/0101576 A1 Mar. 30, 2023

(51) Int. Cl.
*H04W 12/12* (2021.01)
*G08G 1/00* (2006.01)
(Continued)

(52) U.S. Cl.
CPC .............. *H04W 12/12* (2013.01); *G08G 1/22* (2013.01); *H04W 4/029* (2018.02); *H04W 4/40* (2018.02); *H04W 12/104* (2021.01)

(58) Field of Classification Search
CPC ....... H04W 12/12; H04W 4/029; H04W 4/40; H04W 12/104; H04W 4/02; H04W 4/44; H04W 4/46; H04W 4/021; H04W 4/21; H04W 4/023; H04W 4/026; H04W 4/70; H04W 68/02; H04W 88/02; H04W 12/03; H04W 12/069; H04W 4/027; H04W 4/48;
(Continued)

(56) References Cited

U.S. PATENT DOCUMENTS 9,940,840 B1 * 4/2018 Schubert ................ G06Q 30/06
11,242,051 B1 * 2/2022 Konrardy ......... G08G 1/096791
(Continued)

FOREIGN PATENT DOCUMENTS

WO   WO-2018202797 A1 * 11/2018 ........ H04W 36/0009
WO   WO-2020034052 A1 *  2/2020

OTHER PUBLICATIONS

International Search Report and Written Opinion—PCT/US2022/038456—ISA/EPO—Nov. 8, 2022.

*Primary Examiner* — Marcos L Torres
*Assistant Examiner* — Jing Gao
(74) *Attorney, Agent, or Firm* — Patterson & Sheridan LLP

(57) ABSTRACT

Certain aspects of the present disclosure provide techniques for enhancing vehicle operations safety using coordinating vehicle platooning or enhancing platooning safety against location spoofing attacks. In one example, a source user equipment (UE) detects a potential spoofing event associated with location information being altered in an unauthorized manner, the source UE may transmit a request to a platoon control system (PCS) to join a vehicle platoon. In another example, a first UE associated with a lead vehicle in an existing platoon may detect a potential spoofing event associated with location information being altered in an unauthorized manner. The lead vehicle may transmit to a second UE of another vehicle in the platoon an indication of the detection and a request to exchange the respective roles in the platoon. The PCS may also monitor the conditions of the first and the second UEs, and arrange for the platoon reorganization.

26 Claims, 18 Drawing Sheets

(51) Int. Cl.
*H04W 4/029* (2018.01)
*H04W 4/40* (2018.01)
*H04W 12/104* (2021.01)

(58) Field of Classification Search
CPC ... H04W 84/005; H04W 12/63; H04W 4/025; H04W 4/38; H04W 64/003; G08G 1/22; G08G 1/20; G08G 1/0112; G08G 1/096725; G08G 1/166; H04L 67/12; G06Q 30/0201; G06Q 30/0601; G06Q 30/0262; G06Q 30/0643
See application file for complete search history.

(56) References Cited

U.S. PATENT DOCUMENTS

| | | | |
|---|---|---|---|
| 2015/0222659 A1* | 8/2015 | Abou-Rizk | G01S 19/03 726/26 |
| 2019/0041223 A1* | 2/2019 | Yang | G01C 21/30 |
| 2020/0404505 A1 | 12/2020 | Korrapati et al. | |
| 2021/0116937 A1 | 4/2021 | Kim, II et al. | |

* cited by examiner

| Platoon Request Message Header | |
|---|---|
| Field | Value |
| Vehicle ID (M) | 12 Bytes |
| Destination Information (M) | {Lat, Long} |
| Fleet Information (O) | {A, B, C} |
| Vehicle Location Confidence Metric | {} |
| Source GNSS Location | {} |

FIG. 12

IMPLEMENTING CONFIDENCE METRICS IN VEHICLE-TO-EVERYTHING (V2X) COMMUNICATIONS

BACKGROUND

Field of the Disclosure

Aspects of the present disclosure relate to wireless communications, and more particularly, to techniques for coordinating vehicle platooning.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include enhancing vehicle operations safety using coordinated vehicle platooning or enhancing platooning safety against location spoofing attacks or attempts to alter location information in any unauthorized manners.

Certain aspects provide a method for wireless communication performed by a source user equipment (UE). The method generally includes: detecting a potential spoofing event associated with location information being altered in an unauthorized manner; and transmitting, in response to the detected potential spoofing event, a request to a platoon control system (PCS) to join a vehicle platoon, wherein the request includes an indication of the detected potential spoofing event. For example, spoofing occurs when an attacker impersonates an authorized device or user to steal, manipulate, or otherwise alter stored or measurement data. Some spoofing attacks also include spreading malware and/or bypassing access control systems. The present disclosure provides techniques to protect against spoofing as well as any other unauthorized behaviors that may or may not include impersonation (e.g., pretending to be a known user or UE). Altering information in an unauthorized manner includes intercepting, overhearing, relaying, impersonating, replacing, changing, transforming, or otherwise change any aspects or properties of the underlying data. For example, letting another unintended audience device know about the data, changing time stamps on the data, changing the source of the data, or directly modifying coordinates, altitude, or moving speeds in the data by an unauthorized device or system may all constitute altering location information in an unauthorized manner.

Certain aspects provide a method for wireless communication performed by a network entity. The method generally includes: receiving a request from a user equipment (UE), the request triggered by a detection of a potential spoofing event at the UE; and transmitting, to the UE, an assignment of a vehicle platoon for the UE to join based on the request.

Certain aspects provide a method for wireless communication performed by a first UE. The method generally includes: detecting a potential spoofing event associated with location information being altered in an unauthorized manner; transmitting, to a second UE, an indication of the detection of the potential spoofing event, wherein the first UE and the second UE are associated with vehicles in a platoon; and transmitting, to the second UE, a request to exchange a role of a vehicle corresponding to the first UE in the platoon with a role of a vehicle corresponding to the second UE in the platoon.

Certain aspects provide a method for wireless communication performed by a network entity. The method generally includes: receiving an indication from a first user equipment (UE) of a first vehicle in a vehicle platoon, the indication triggered by the first UE detecting a first potential spoofing event associated with location information being altered in an unauthorized manner; transmitting, to a second UE in the vehicle platoon, an indication for the second UE to assume functionalities performed by the first UE in the vehicle platoon.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 12 illustrates an example platoon request message header, in accordance with the certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
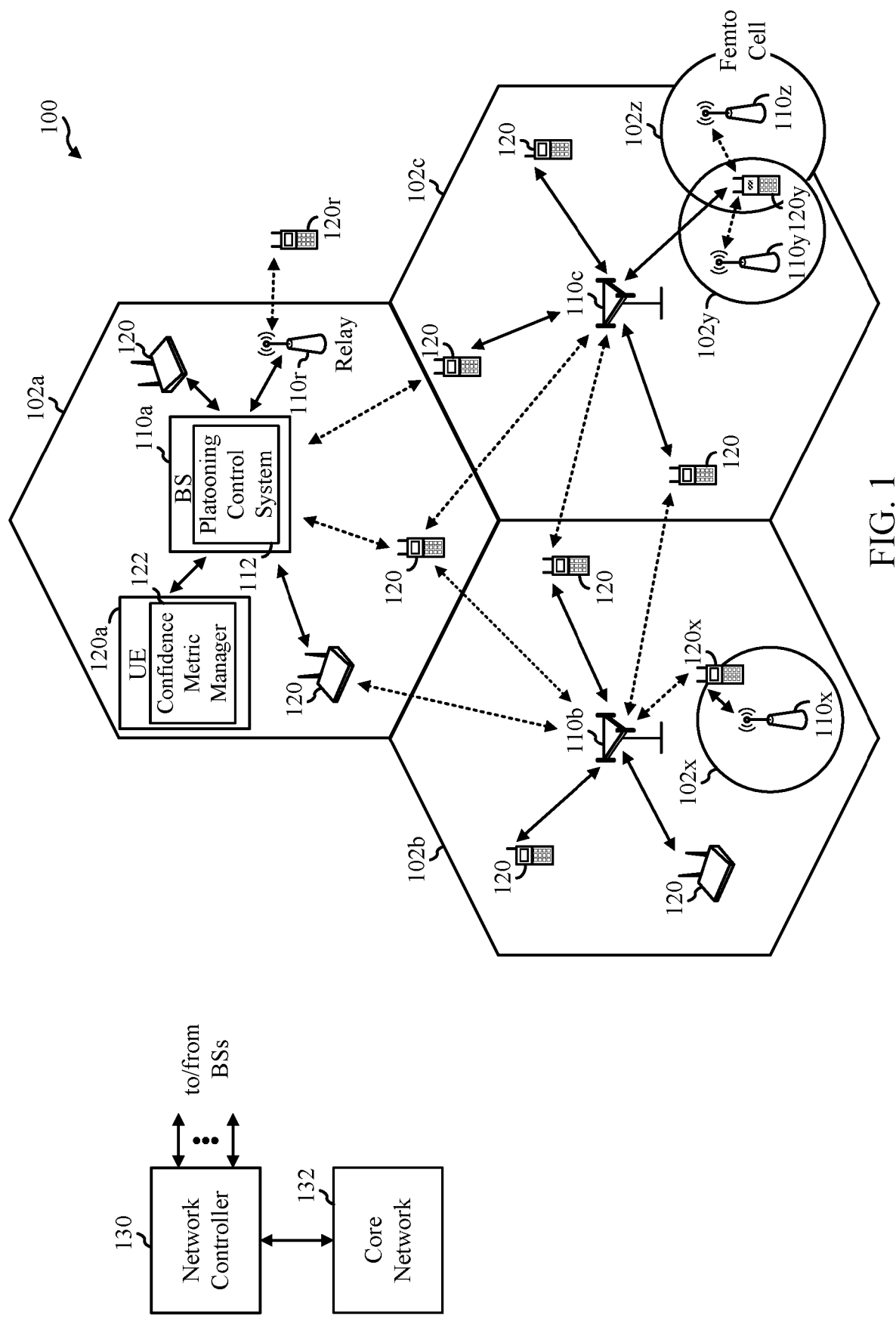
FIG. 1 is a block diagram conceptually illustrating an example wireless communication network, in accordance with certain aspects of the present disclosure.

Aspects of the present disclosure provide apparatus, methods, processing systems, and computer readable mediums for enhancing vehicle operations safety using coordinating vehicle platooning or enhancing platooning safety against location spoofing attacks.

In one high-level example, when a source user equipment (UE) (e.g., a vehicle outside a platoon) detects a potential spoofing event associated with location information being altered in an unauthorized manner, the source UE may transmit a request to a platoon control system (PCS) to join a vehicle platoon. The request may include an indication of the detected spoofing. Because platooning uses various onboard sensors and control feedback via sidelink communications, the source UE may be sure to not rely on the potentially erroneous location data for operation once joining the platoon. Thus, platooning may enhance operational safety of the source UE, by allowing it to receive valid location data.

In another high-level example, a first UE associated with a lead vehicle in an existing platoon may detect a potential spoofing event associated with location information being altered in an unauthorized manner. The lead vehicle may transmit to a second UE of another vehicle in the platoon an indication of the detection and a request to exchange the respective roles in the platoon. The PCS may also monitor the conditions of the first and the second UEs, and arrange for the platoon reorganization. For example, spoofing occurs when an attacker impersonates an authorized device or user to steal, manipulate, or otherwise alter stored or measurement data. Some spoofing attacks also include spreading malware and/or bypassing access control systems. The present disclosure provides techniques to protect against spoofing as well as any other unauthorized behaviors that may or may not include impersonation (e.g., pretending to be a known user or UE).

In general, altering information in an unauthorized manner includes intercepting, overhearing, relaying, impersonating, replacing, changing, transforming, or otherwise change any aspects or properties of the underlying data. For example, letting another unintended audience device know about the data, changing time stamps on the data, changing the source of the data, or directly modifying coordinates, altitude, or moving speeds in the data by an unauthorized device or system may constitute altering location information in an unauthorized manner.

Vehicle platooning is one of numerous features of self-driving or assisted driving vehicles. A vehicle platoon generally refers to a group of vehicles behaving as one, traveling safely and closely together at high speeds with continuous intercommunication, which is generally enabled by cellular vehicle-to-everything (C-V2X) communications. Vehicles in the platoon may continuously transmit and receive basic safety messages (BSMs) at a specified rate. The BMSs include location information along with other movement information (e.g., velocity, acceleration, etc.) of the transmitter vehicle. The vehicles in the platoon rely on the C-V2X communications (and the location information therein) for various safety features and decisions. Although the C-V2X communications are often protected and validated by certification or encryption mechanisms, the location information therein may nonetheless be spoofed (e.g., altered into erroneous information).

The spoofed location information may cause mishaps or accidents of a self-driving or assisted driving vehicles and one or more platooning vehicles that are operating based on the location information. A spoofing attack occurs when a program or device falsifies data by pretending to be a valid source. A global positioning system (GPS) spoofing attack attempts to deceive a GPS receiver by broadcasting fake GPS signals, structured to resemble a set of normal GPS signals, or by rebroadcasting actual signals captured at another time or place. For example, during a spoofing attack, a radio transmitter located nearby may transmit fake GPS signals to deceive a target receiver. The spoofed location information may be included in BSMs and transmitted by a UE as trustworthy location information.

The present disclosure provides various techniques for handling such spoofing attacks, and enhancing safety of the self-driving vehicles and platooning members. For example, when the location information is spoofed (e.g., by providing a wrong global navigation satellite system (GNSS) location, the attacked vehicle may request to join a platoon such that the attacked vehicle may use the information provided by the platoon to continue operation and not rely on the spoofed location information. If one or more vehicles in a platoon face spoofing attack, the vehicles may swap positions to enable non-spoofed vehicles to make decisions for the platoon, or if none available, the platoon may disintegrate.

Each vehicle may include multiple UEs, including the UE that coordinates platooning. Vehicles may be associated with UEs using different methods of communications, such as direct physical connections, near-field communications, among others. Vehicles themselves may include operating systems that enable themselves being standalone UEs. The UEs associated with the vehicles or the vehicles themselves may connect with a network via uplinks and downlinks, and connect with each other via sidelinks.

Among various sidelink communication standards, the V2X standards (further discussed below in relation to FIGS. 4A and 4B) enable vehicles to support fully autonomous driving and advanced driver assistance systems (ADAS). In vehicle platooning, V2X is also used to aid and provide efficient and smooth vehicular movements through mutual interaction and co-ordination, such as specifying positions, distances, and speeds, in relation to other vehicles in the platoon. Some sensor data (e.g., distance change between two vehicles, acceleration, distance traveled in certain durations) may be used to deduce and validate location information received, according to aspects of this disclosure.

The following description provides examples of enhancing vehicle operations safety against location spoofing attacks, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 including one or more base stations (BSs) 110 and UEs 120. The one or more BSs 110 may ensure that one or more UEs 120 can have secure and reliable sidelink communications (e.g., C-V2X) to support or coordinate vehicle platooning and/or autonomous operations. In some examples disclosed, the BS 110 may include a platoon control system (PCS) 112. The UE 120a may include a confidence metric manager 122 for detecting and responding to potential spoofing events. In some cases, the UE 120a may be associated with a vehicle outside a platoon or a vehicle (such as a lead vehicle) of a platoon. In general, the UEs 120 may be configured to perform operations 700 of FIG. 7 and operations 1500 of FIG. 15, while the BS 110 may be configured to perform operations 800 of FIG. 8 and operations 1600 of FIG. 16.

As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces. The wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
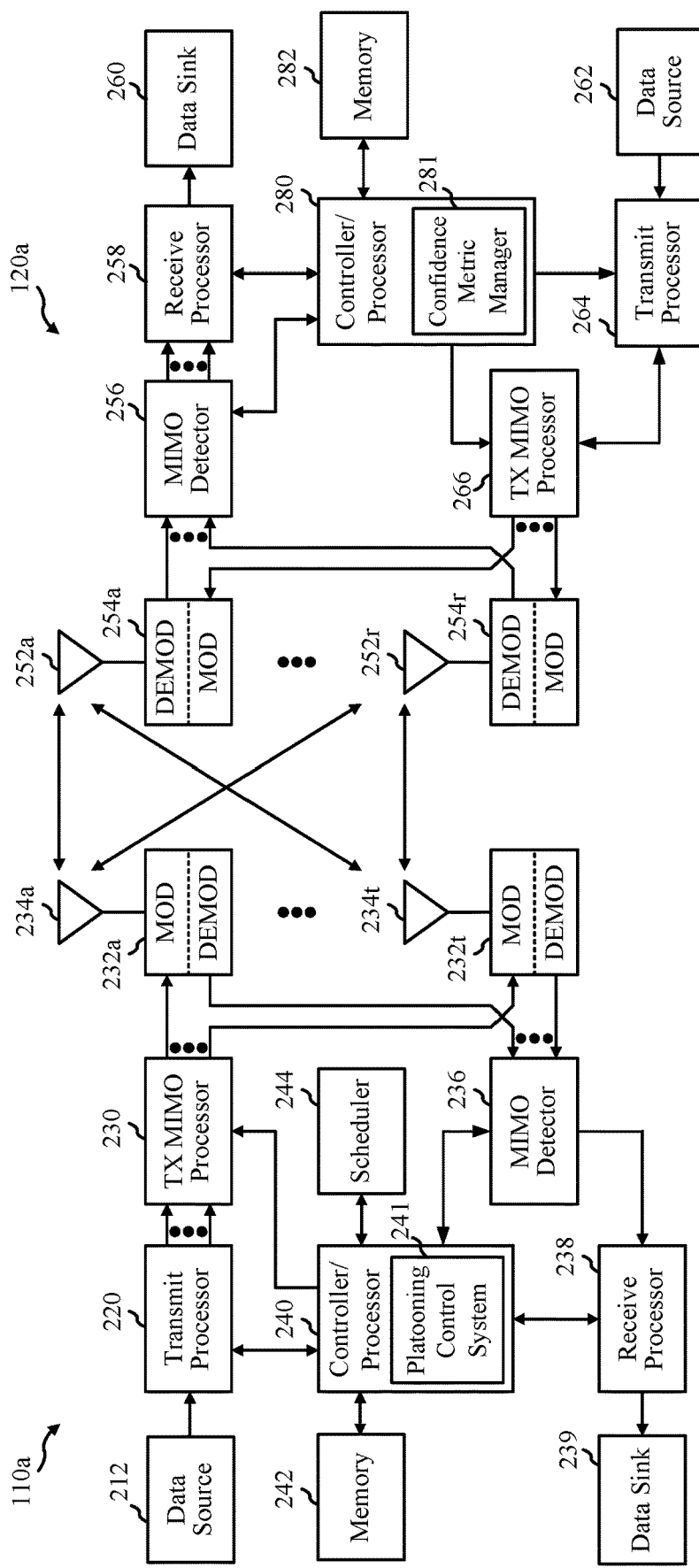
FIG. 2 is a block diagram conceptually illustrating a design of an example a base station (BS) and user equipment (UE), in accordance with certain aspects of the present disclosure.

FIG. 2 illustrates example components of BS 110a and UE 120a (one example of the BS 110 and the UE 120 depicted in FIG. 1), which may be used to implement aspects of the present disclosure. For example, antennas 252a, processors 266, 258, 264, and/or the controller/processor 280 of the UE 120a, especially the confidence metric manager 281 of the controller/processor 280, may be configured to perform (or cause UE 120a to perform) operations 700 of FIG. 7; and/or antennas 234a, processors 220, 260, 238, and/or the controller/processor 240 of the BS 110, especially the PCS 241 of the controller/processor 240, may be configured to perform (or cause BS 110 to perform) operations 800 of FIG. 8.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
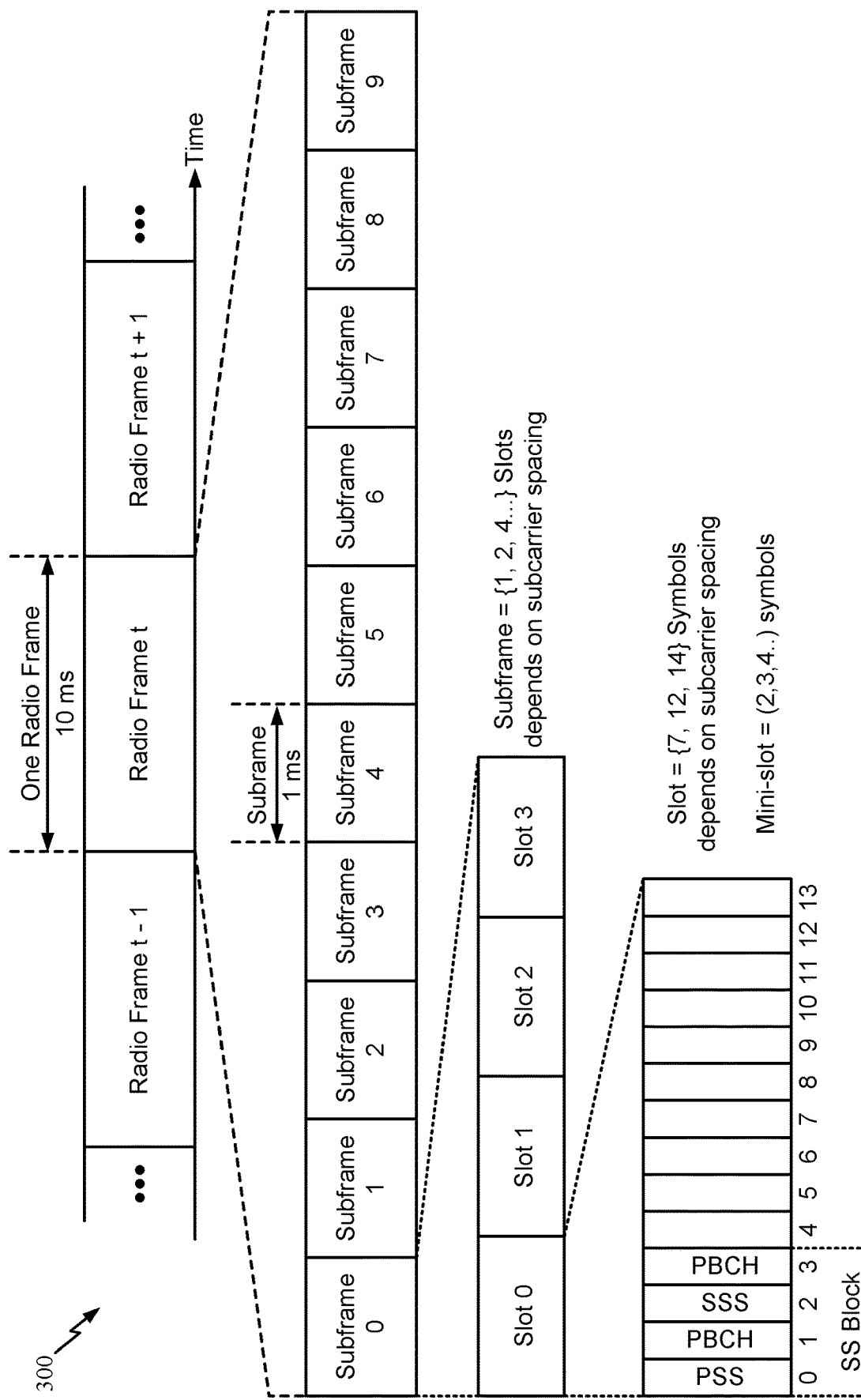
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
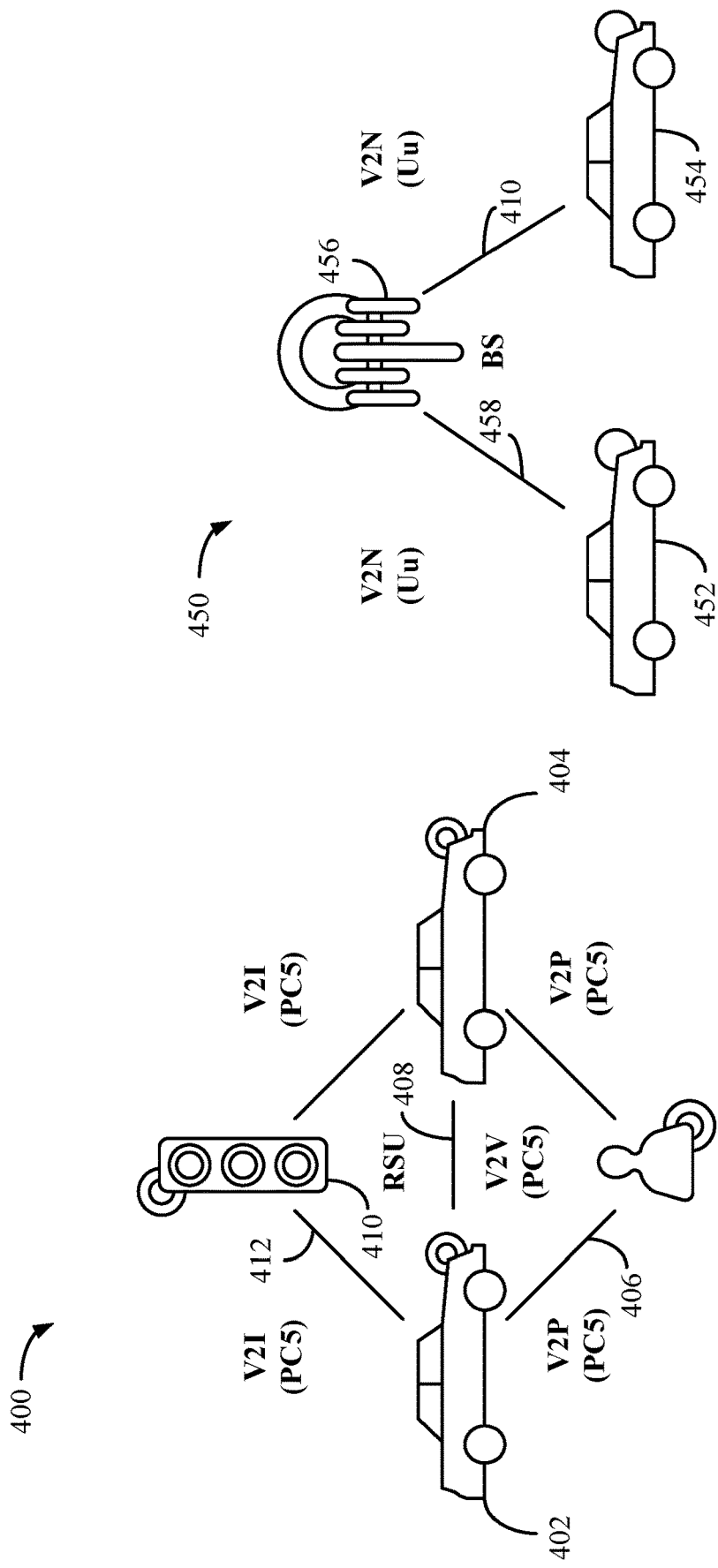
FIG. 4A and FIG. 4B show diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, roadside service unit 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may also be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Aspects of the disclosure relate to sidelink communications, such as cellular-vehicular-to-anything (C-V2X) communications. C-V2X can offer vehicles low-latency V2V, V2I, and V2P communication. C-V2X networks can operate without cellular infrastructure support. For example, C-V2X communication allows direct communication between two UE devices, without transmissions through the BS, functioning by continuous monitoring and decoding of other UE devices. In C-V2X, vehicles can autonomously select their radio resources. For example, the vehicles may select resources, such as semi-persistent scheduling (SPS) resources, according to an algorithm. The algorithm may be a resource allocation algorithm specified by the 3GPP wireless standards.

Current 3GPP C-V2X design targets deployment in a licensed spectrum, either by deployment in a shared, licensed cellular band or by deployment in a dedicated intelligent transportation system (ITS) spectrum. In the licensed spectrum, the spectrum may be assigned exclusively to operators for independent usage. Licensed spectrum may either be shared or dedicated. Shared licensed spectrums provide bandwidth up to a specified level and the bandwidth is shared among all subscribers. Therefore, in a licensed cellular band, a C-V2X system shares uplink spectrum in the cellular network. On the other hand, dedicated internet spectrum provides guaranteed bandwidth at all times, thereby providing spectrum exclusivity when the C-V2X design is deployed in a dedicated ITS spectrum.

ITSs have been developed for decades to support a wide variety of safety-critical and traffic-efficient applications. Under current FCC rules, the 5.9 GHz band is reserved for dedicated short-range communication (DSRC), which facilitates both V2V and V2I communications.

Other countries and regions have also allocated spectrums around 5.9 GHz to V2X communications; however, dedicated spectrums may not be guaranteed in all locations due to spectrum scarcity. Spectrum scarcity has emerged as a primary problem encountered when trying to launch new wireless services in some regions. The effects of this scarcity have led some locations to allocate spectrums for LTE V2X only, leaving allocated spectrum unavailable for NR V2X. 3GPP Release 16 includes specification for 5G NR C-V2X which targets advanced V2X use cases, such as autonomous driving. Rel-16 5G NR C-V2X goes beyond technology that targets basic safety, by adding direct multicast communication technology for advanced safety, increased situational awareness, energy savings, and faster travel time.

In some cases, deployment of C-V2X communications involves deployment in an unlicensed spectrum. Unlicensed spectrum refers to radio frequency bands in which technical rules are specified for both the hardware and deployment methods of radio systems such that the band is open for shared use by an unlimited number of unaffiliated users. In unlicensed spectrum, the spectrum may be available for non-exclusive usage subject to some regulatory constraints (e.g., restrictions in transmission power).

In an unlicensed spectrum, a minimum channel bandwidth may be specified in accordance with regional regulations, and any technological device may transmit in a bandwidth greater than the specified minimum channel bandwidth. For example, in some regions the minimum channel bandwidth may be set at 5 megahertz (MHz). There exists a wide range of unlicensed spectrums available from 5 gigahertz (GHz) to 6 GHz (e.g., Unlicensed National Information Instructure 3 (U-NII-3) operating between 5.725 GHz and 5.850 GHz or U-NII-4 operating between 5.850 GHz and 5.925 GHz). As used herein, the 5 GHz unlicensed spectrum, also referred to as the U-NII band, comprises the frequency range between 5150 MHz and 5925 MHz. The 6 GHz unlicensed spectrum potentially comprises the frequency range from 5925 MHz up to 7125 MHz.

In contrast with most licensed assignments of spectrum use rights, devices or systems operating on an unlicensed basis enjoy no regulatory protection against interference from other licensed or unlicensed users in the band. Currently, the unlicensed spectrum may be utilized by Wireless Local Area Networks (WLAN), such as the ones that are based on IEEE 801.11a/g/n/ac technologies, which are also referred to as Wi-Fi systems. For example, a Wi-Fi device may transmit, for example, in a channel bandwidth of 20 MHz, 80 MHz, 160 MHz, or any other channel bandwidth above 5 MHz.

C-V2X communications deployed in an unlicensed spectrum may operate in either a distributed or a centralized manner. In distributed C-V2X, UEs communicate independently without the assistance of a central node (e.g., a BS) scheduling transmissions between the UEs. In centralized C-V2X, a central node controls and assists with sidelink communications.

Although continuous monitoring may help to effectuate sidelink communication, UEs in an unlicensed spectrum may be incapable of meeting these demands. Continuous monitoring of all carriers/frequencies for potential sidelink transmission may be an unrealistic expectation when a UE is deployed in an unlicensed spectrum due to the wide range of available spectrums (e.g., U-NII-3 or U-NII-4) in the unlicensed band coupled with the band's limited capability.

Accordingly, capability of the UE to transmit and receive in a limited number of carriers (e.g., frequencies) known to all UEs is beneficial to reduce the UE's burden of monitoring all carriers within in an unlicensed band. For example, this burden may be alleviated where UEs have common understanding of carrier(s) used for C-V2X communication. However, statically limiting C-V2X communication to a specific unlicensed carrier may lead to sub-optimal performance, such as an increased probability of interference with other technologies within the band (other technologies may access the unlicensed spectrum as long as they comply with regulatory requirements).

Example Coordinating Vehicle Platooning with V2X Assistance

Figure 5:
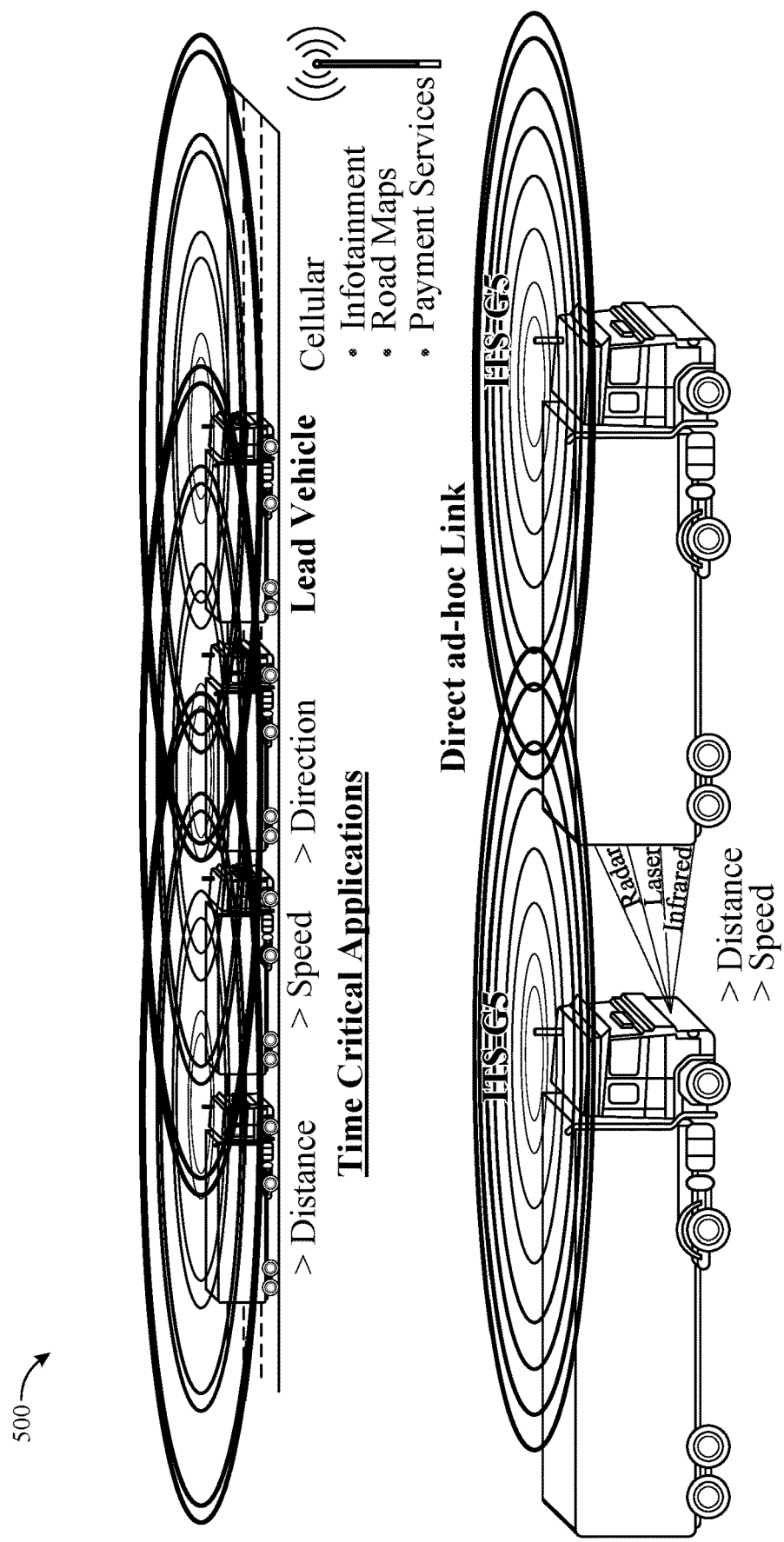
FIG. 5 is a schematic illustration of vehicle platooning, in accordance with aspects of the present disclosure.

FIG. 5 is a schematic illustration 500 of vehicle platooning, in accordance with aspects of the present disclosure. As shown, the vehicle platoon may include a lead vehicle (also referred to as an anchor vehicle, or a platoon UE). The lead vehicle constantly communicates with other member vehicles in the platoon, as indicated by the wave signals. The lead vehicle may determine the travel route, traveling speeds and acceleration, headway (i.e., distances between vehicles in succession), and other operation details. The lead vehicle and each member vehicle of the platoon may include various onboard sensors and processing units to enable a level of driving autonomy or assistance.

For example, the member vehicles need not be fully autonomous to join the platoon, as some of the sensing, control, or determination operations may be distributed among vehicles in the platoon. Such coordination is achieved through the communications among the platoon vehicles and communications with platoon control systems (PCS) illustrated as the cellular base station. In some cases, the PCS provides, via the cellular network, infotainment, road maps, payment services, and other information services in addition to the platooning coordination. The communications between member vehicles in the platoon may be established using direct ad-hoc link, such as V2V PC5 interface 408 in FIG. 4A.

Each member vehicle of the platoon may include an onboard computer or a processing unit, configured to receive and transmit data via the direct ad-hoc link. The data may include measurements from various onboard sensors, including at least one of a radar, laser, or infrared sensor for detecting vehicle to vehicle distance, speeds, and other driving information for automated driving.

Figure 6:
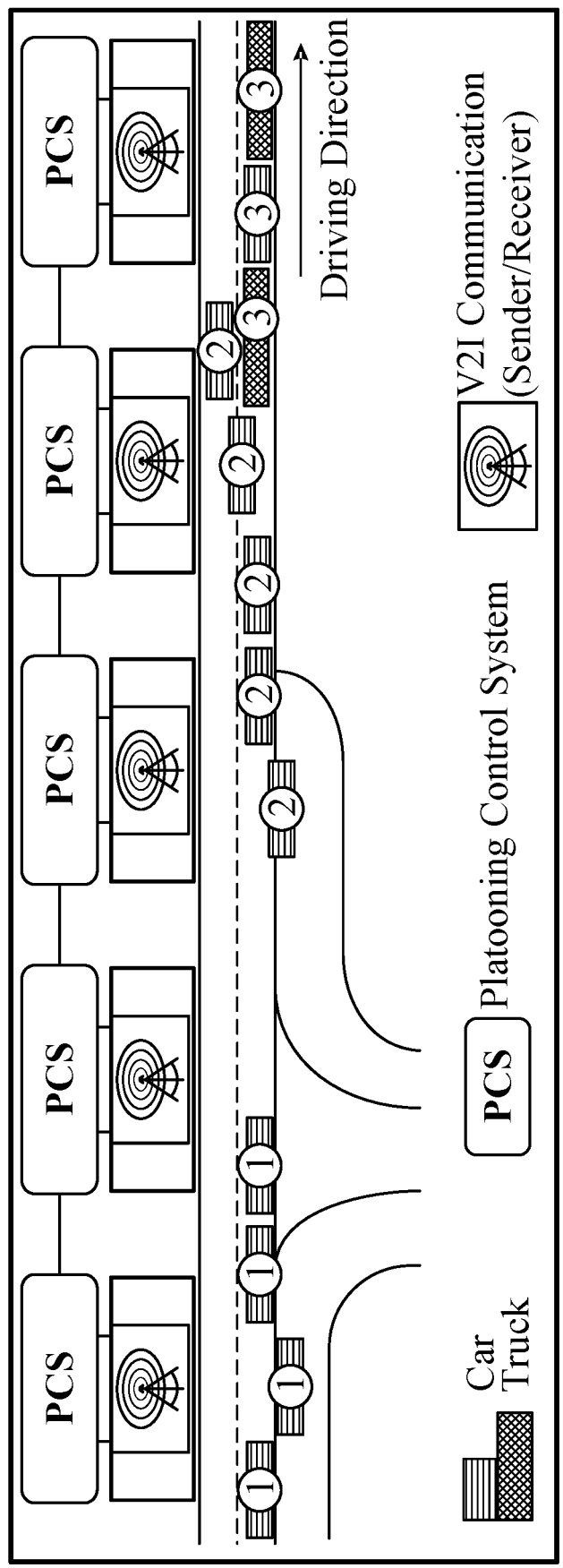
FIG. 6 is a schematic illustration of coordinating multiple vehicle platoons, in accordance with aspects of the present disclosure.

FIG. 6 is a schematic illustration of coordinating multiple vehicle platoons (three platoons: platoon 1, platoon 2, and platoon 3 shown), in accordance with aspects of the present disclosure. As shown, because the member vehicles in a platoon can accelerate or decelerate simultaneously without human reaction delays, platooning enables configuring and maintaining a minimal distance or headway between moving vehicles at high speeds. In some examples, a source vehicle may broadcast a request (e.g., to the PCS and/or the lead vehicle) to join a platoon that shares the same destination information, vehicle dimension, and other information. In response to the request, the platoon or the lead vehicle may accept the request and notify the source vehicle with a confirmation. Dynamically based on the destination information, the source vehicle position within the platoon may be adjusted in preparation for the source vehicle to leave the platoon. While leaving the platoon, similar handshaking with the PCS or the lead vehicle may be performed.

As shown in FIG. 6, the numerous PCS installations provide V2I communication to the platoons nearby. The three platoons 1, 2, and 3 show different driving scenarios. In platoon 1 of four light vehicles (e.g., cars), one vehicle may be requesting to leave the platoon and exit the highway. In platoon 2 of five light vehicles, one vehicle joins the platoon at the end from a roadway entrance, while the lead vehicle changes to the passing lane to overtake platoon 3. In platoon 3 of three mixed vehicles, two trucks and a car form the platoon and are distanced close to each other. Therefore, the communication among the vehicles and with the PCS enables safety operation of leaving, joining, lane changing, and cruising of platoons of different vehicles.

Aspects of the present disclosure provide techniques for coordinating vehicle platooning with V2X assistance. Vehicles in the platoon may be associated with UEs that are C-V2X capable or the vehicles themselves may be equipped with telematics systems with C-V2X capable modems. A source UE (e.g., a wireless device within a vehicle) may transmit a request to a base station to join a vehicle platoon. The request may indicate at least one of: an occupancy parameter of the first vehicle associated with the source UE; an autonomy level of the first vehicle; or a travel preference parameter. Upon approval, the source UE may receive a message indicating confirmation that the source vehicle is allowed to join the platoon.

Example Vehicle Operations Against Location Spoofing Attacks in a Source Vehicle The present disclosure provides techniques for enhancing safety of autonomous or semiautonomous vehicles that receive spoofed location information. FIGS. 7-10 illustrate example operations for implementing various such aspects of the present disclosure.

Figure 7:
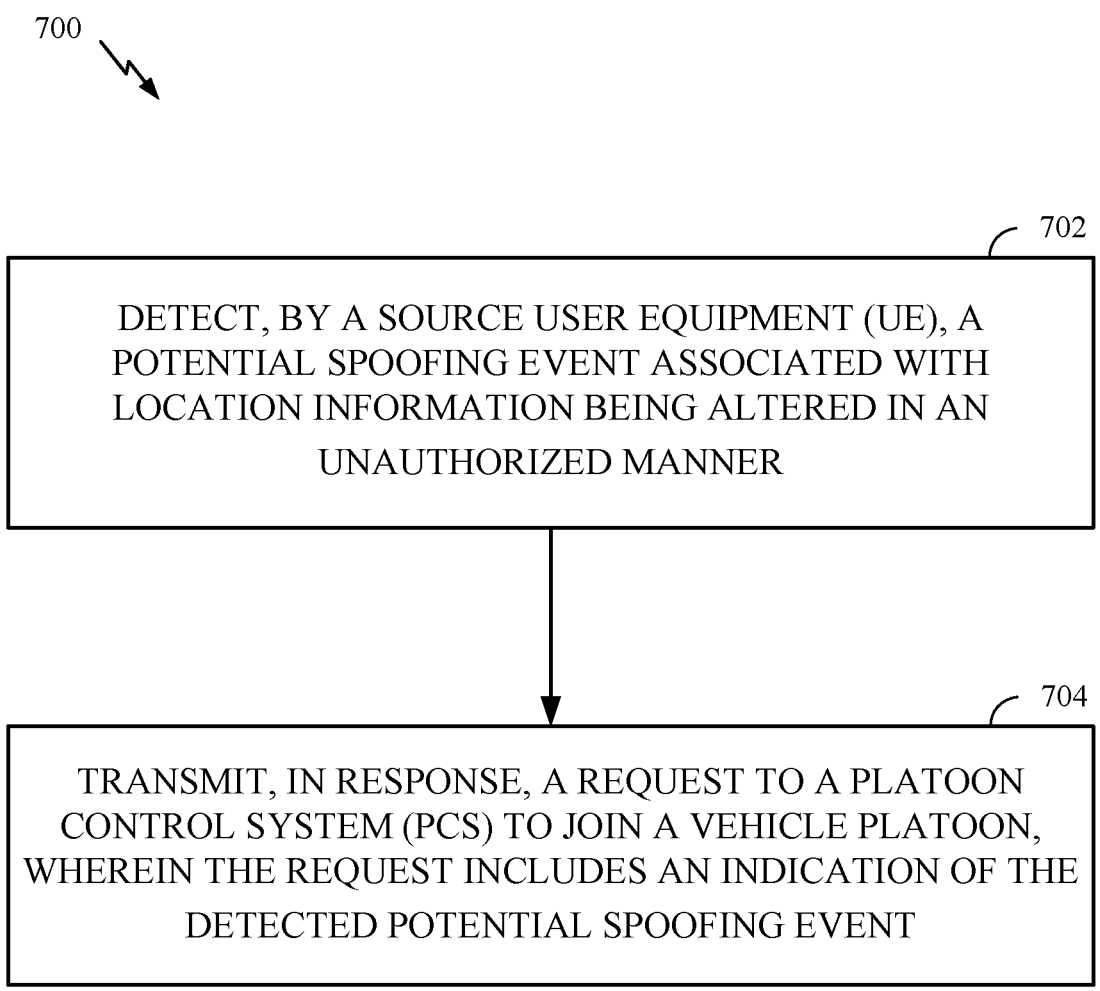
FIG. 7 is a flow diagram illustrating example operations for wireless communication by a source UE, in accordance with certain aspects of the present disclosure.

FIG. 7 is a flow diagram illustrating example operations 700 for wireless communication by a source UE or a UE associated with a vehicle not associated with a platoon, in accordance with certain aspects of the present disclosure. The operations 700 may be performed, for example, by a source UE (e.g., the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begin, at 702, by detecting a potential spoofing event associated with location information being altered in an unauthorized manner. In aspects, the detection of the potential spoofing event may be based on a confidence metric, which indicates a probability that the source UE is receiving spoofed location information. For example, when the confidence metric is above a threshold value, indicating a predefined level of certainty, the source UE determines that a potential spoofing event has been detected. The confidence metric may be computed based on data acquired in onboard sensors of the source UE independent from the location information received.

For example, onboard accelerometers may capture a history of accelerations experienced by the source UE. The source UE may compute a travel distance based on the history of accelerations and compare the travel distance with the locations difference corresponding to the same time frame (i.e., the same starting time and end time as the history of accelerations). The comparison result may include measurement errors, signal noise, and spoofing attempts. The confidence metric may define what tolerance is acceptable for measurement errors and noises. The tolerance threshold values may be obtained by calibration under different specific circumstances (e.g., geographical regions, traveling speeds, etc.).

Although the confidence metric may be used as a basis in detecting the potential spoofing event, the confidence metric is not required. As further discussed below (e.g., FIG. 13), other conditions may also trigger a determination of a potential spoofing event. For example, the source UE may receive a warning or alert from another device (e.g., a BS or a second UE) that the location information of the source UE may have been altered in an unauthorized manner.

At 704, the source UE transmits, in response to the detection, a request to a platoon control system (PCS) to join a vehicle platoon, wherein the request includes an indication of the detected potential spoofing event. At a high level, when the source UE cannot trust the location information received in view of the detection of the potential spoofing event, the source UE may seek help from a vehicle platoon, because the source UE may not need to rely on the location information for autonomous or semi-autonomous driving once joining the vehicle platoon. The joining processes may be similar to the procedures discussed in relation to FIGS. 5 and 6 above. In addition, as the location information of the source UE may have been spoofed or compromised, after joining the platoon, the source UE may not be allowed or enabled to transmit V2X messages that may carry the spoofed location information until the spoofing event has been resolved, such as when the confidence metric decreases below.

Figure 8:
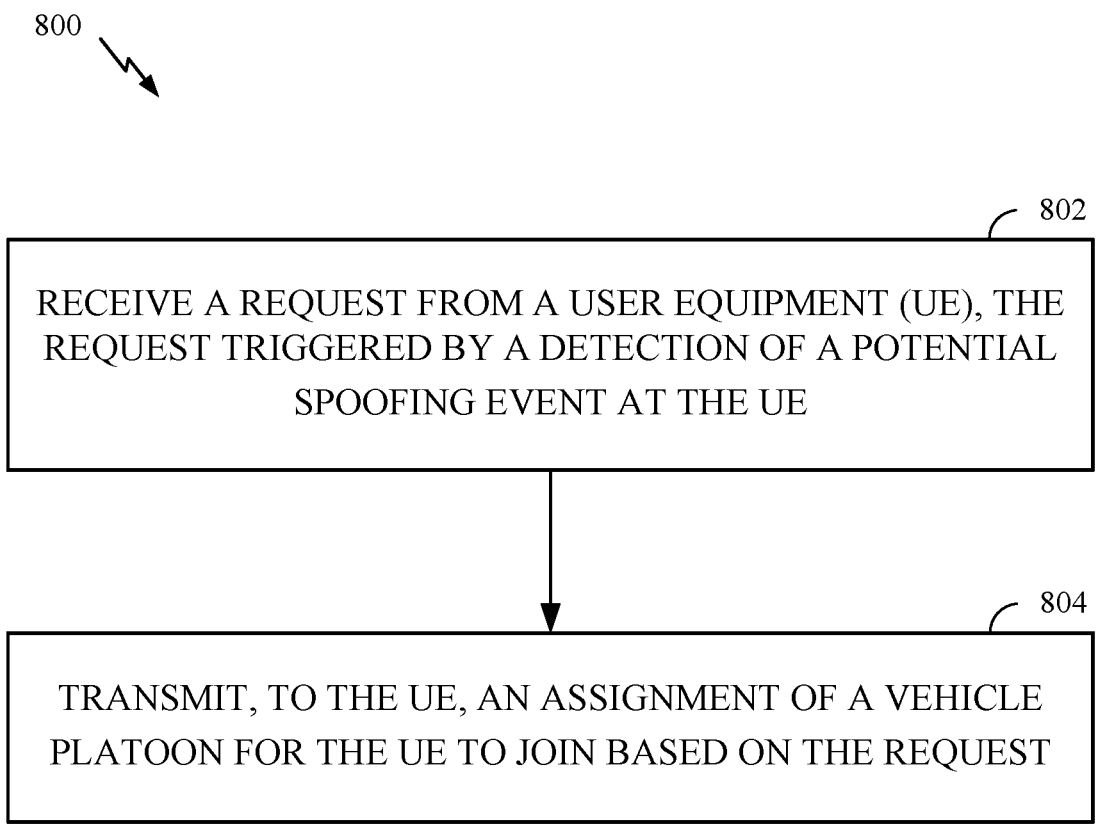
FIG. 8 is a flow diagram illustrating example operations for wireless communication by a network entity, in accordance with certain aspects of the present disclosure.

FIG. 8 is a flow diagram illustrating example operations 800 for wireless communication that may be considered complimentary to the operations 700 For example, operations 800 may be performed, by a PCS and responding to a request from a source UE performing operations 700 of FIG. 7. The operations 800 may be implemented as software components that are executed and run on one or more processors (e.g., controller/processor 240 of FIG. 2). Further, the transmission and reception of signals by the PCS in operations 800 may be enabled, for example, by one or more antennas (e.g., antennas 234 of FIG. 2). In certain aspects, the transmission and/or reception of signals by the PCS may be implemented via a bus interface of one or more processors (e.g., controller/processor 240) obtaining and/or outputting signals.

The operations 800 begin, at 802, by receiving a request from a UE, such as the source UE of operations 700, the request triggered by a detection of a potential spoofing event at the UE. The request may include a confidence metric that indicates a probability that the UE is receiving spoofed location information of the potential spoofing event. In some cases, the request includes at least one of: a vehicle identifier, destination information, a source positioning location, or the confidence metric.

At 804, operations 800 continue by transmitting, to the UE, an assignment of a vehicle platoon for the UE to join based on the request. The platooning assignment processes may be similar to the procedures discussed in relation to FIGS. 5 and 6 above. In aspects, the assignment may have a higher priority when the UE is associated with an autonomous vehicle than when the UE is associated with a non-autonomous vehicle. For example, when the PCS receives two or more requests from two or more UEs, the PCS will first assign the UE associated with an autonomous vehicle to a platoon before assigning the other UE associated with a non-autonomous vehicle.

In aspects, the PCS may transmit to at least one platoon UE (e.g., corresponding to a vehicle of the platoon assignment) an instruction for the at least one platoon UE to transmit a beacon to the UE assigned with the platoon. The beacon signal may be measured by the UE to verify the potential spoofing event. In aspects, the PCS may transmit to a roadside unit (RSU), an instruction for the RSU to measure a location of the UE for comparison with the location information in the UE for assessing the potential spoofing event. The PCS may confirm the assignment of the vehicle platoon based on the location measured by the RSU, such as when the measurement confirms the spoofing event.

Figure 9:
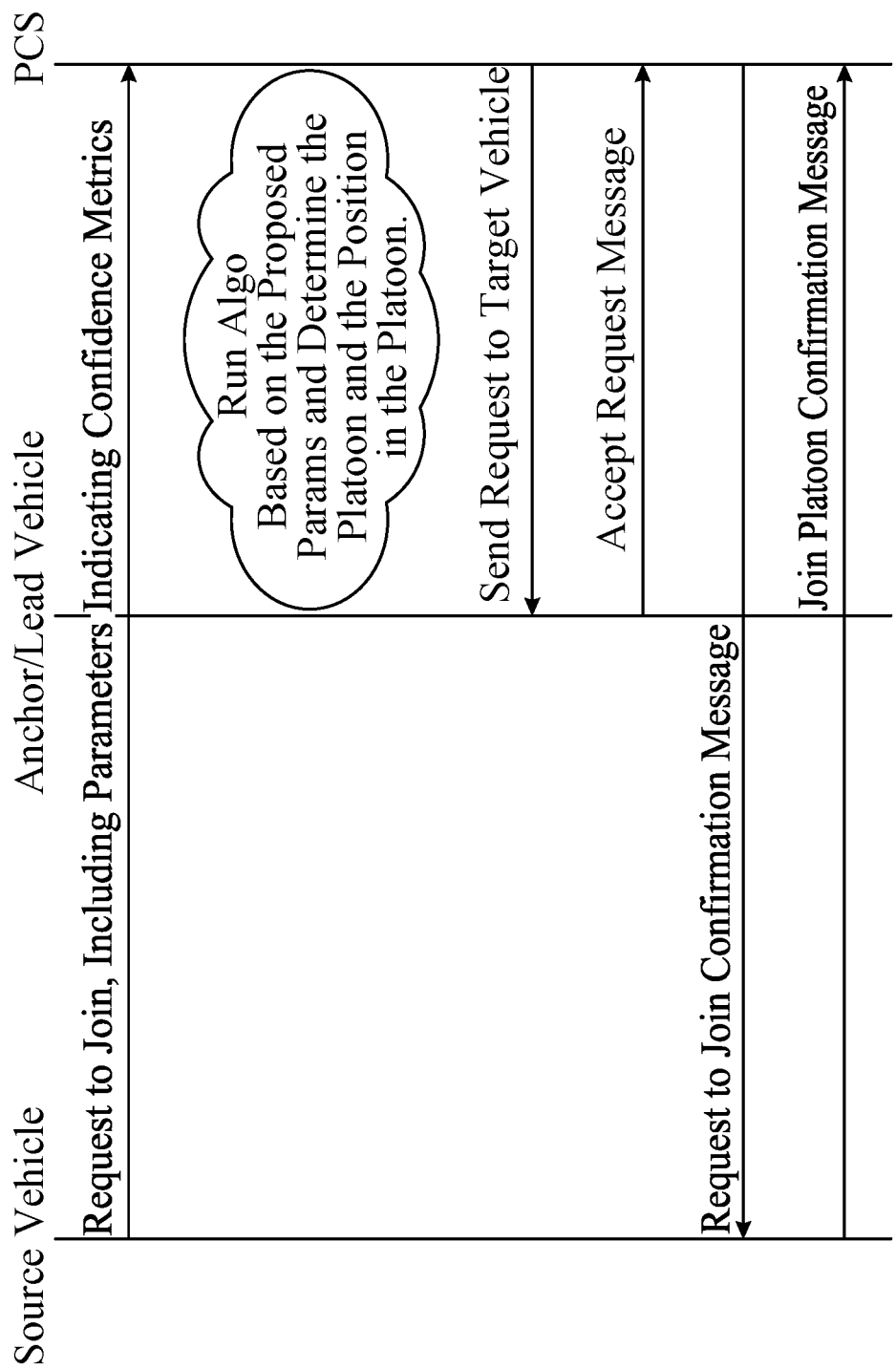
FIG. 9 illustrates a call flow diagram showing communications among the source vehicle, a lead vehicle, and a platoon control system (PCS), in accordance with certain aspects of the present disclosure.

Operations 700 of FIG. 7 and 800 of FIG. 8 may be understood with reference to the call flow diagram of FIG. 9. FIG. 9 illustrates a call flow diagram showing communications among the source vehicle, a lead vehicle, and a PCS, in accordance with certain aspects of the present disclosure.

As shown, the source vehicle may first send a request to PCS, the request indicates at least parameters indicating confidence metrics regarding potential spoofing events of the source vehicle. The PCS executes an algorithm based on the one or more criteria or parameters in the request and determines at least one suitable or available platoon. The PCS may also determine a position of the selected platoon for accepting the source vehicle. The PCS may then send or forward the request (including the position information) to the lead vehicle of the selected platoon. The lead vehicle has the authority to decide whether to accept the request. When the lead vehicle decides that the request is accepted, the lead vehicle sends an acceptance message to the PCS, which then forwards the acceptance message (or joining confirmation message) to the source vehicle. The source vehicle may then join the selected platoon and send a confirmation message back to PCS after joining the selected platoon.

Figure 10:
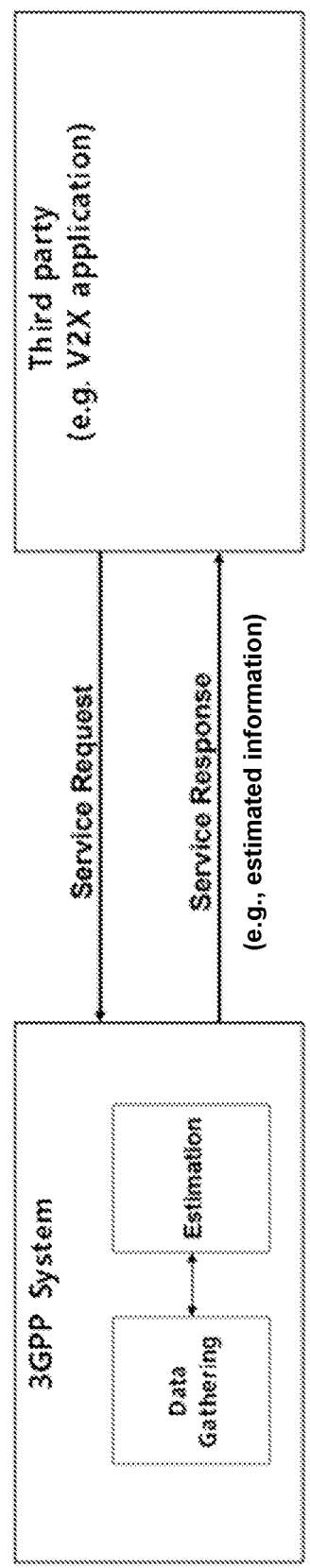
FIG. 10 illustrates an example of cross-verifying location information using a roadside unit (RSU), in accordance with certain aspects of the present disclosure.

The source vehicle may first estimate the position uncertainty using its own algorithm and then determine a confidence metric for concluding on the possible spoofing. FIG. 10 illustrates an example of external verification (e.g., verification outside of the PCS) of location information, in accordance with certain aspects of the present disclosure. As shown, a third party V2X application on the source vehicle may transmit a service request to a system, which performs estimation of the actual location of the source UE based on the gathered data. The system may then transmit a service response to the source vehicle to provide the estimated location information. In one option, the source vehicle may determine the confidence metric in binary, such as by indicating that whether its GNSS location is possible spoofed or not. In another option, the confidence metric may be determined based on the position uncertainty. For example, the source vehicle may be configured to indicate one of the discrete levels of the confidence metric. Upon determining the confidence metric, the source vehicle may indicate the spoofing event and the confidence metric to the PCS.

Figure 11:
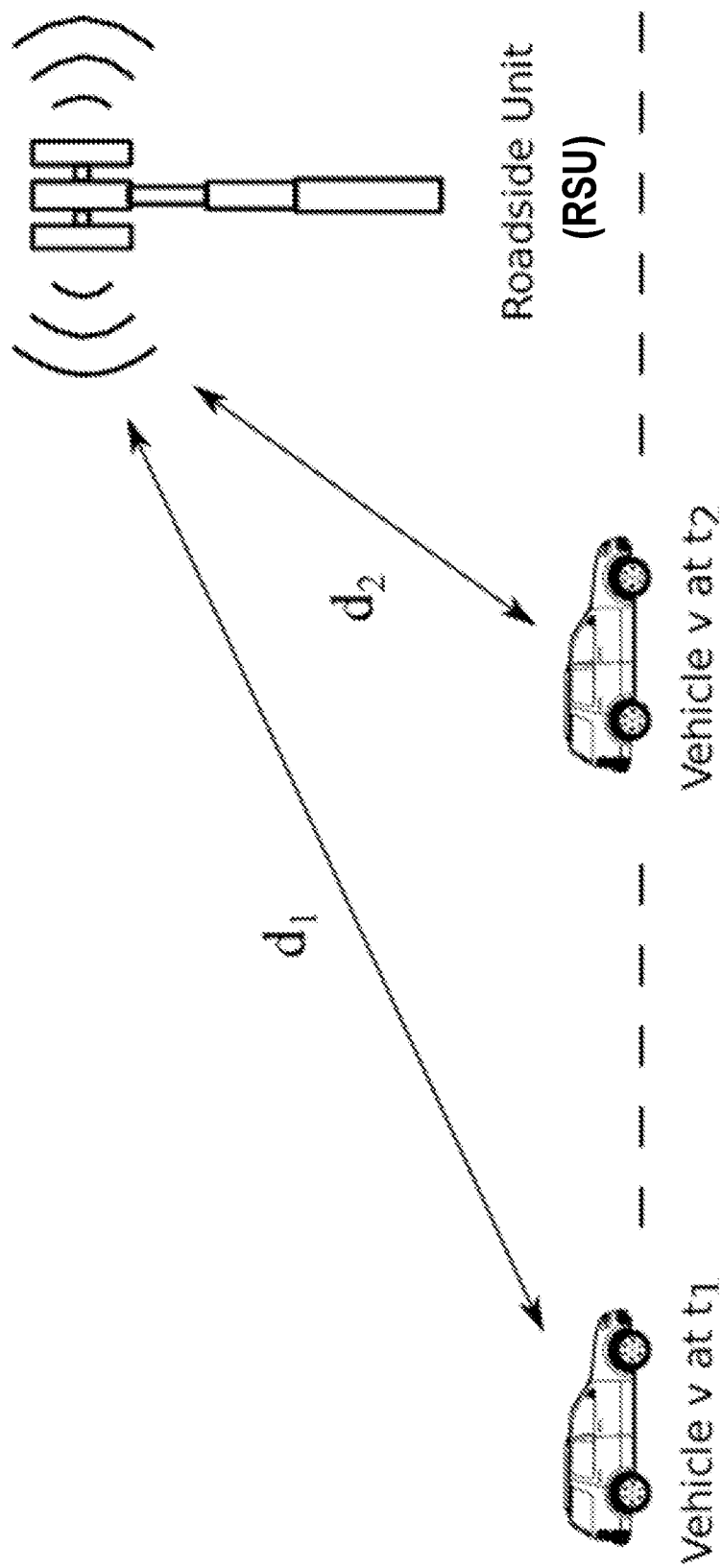
FIG. 11 illustrates an example of external verification of location information, in accordance with certain aspects of the present disclosure.

The PCS may cross-validate and confirm the spoofing indication sent by the source UE. For example, the PCS may configure the other registered non-spoofed vehicles, for which the locations are known by the PCS, to send a beacon to the source vehicle. The source vehicle is configured to measure the beacon signals at the indicated schedule. The source vehicle may use the measurement to determine if a spoofing event has occurred. The PCS additionally may use RSUs and other static infrastructures to range the source vehicle and estimate its location more accurately. FIG. 11 illustrates an example of cross-verifying location information using an RSU, in accordance with certain aspects of the present disclosure. As shown, the RSU may determine the relative distance from the passing by vehicle based on ranging techniques. The RSU may then estimate the travel distance of the vehicle and verify whether the changes in the source location information matches the estimated distance. This way, with the beacon signals measured and location estimation by the RSUs, the PCS may conclusively determine if the source UE is under a spoofing attack.

The PCS may then determine whether the source UE actually needs Platoon assistance, and accordingly determine a platoon for that source vehicle based on additional parameters, such as an occupancy parameter, an autonomy level, a travel preference parameter (velocity, destination, etc.). Assuming that the source UE is under a location spoofing attack, the PCS may determine the actual location of the source UE based on RSU and other registered vehicles of a nearby platoon, as these devices may provide various sensor data feedback of the source vehicle to the PCS without relying the spoofed location information.

An example of a platoon request message header 1200 is shown in FIG. 12. As shown, the platoon request message header 1200 includes at least a field indicating the vehicle identity, destination information for platoon assignment, fleet information, a vehicle location confidence metric, and a source GNSS location. The destination information and the source GNSS location information may respectively include latitude and longitude coordinates. The vehicle location confidence metric may include a binary indication of whether a potential spoofing event has been detected, or a level of confidence that the source GNSS location information has been spoofed.

As discussed above, the source vehicle may seek to join the platoon for enhancing autonomous or semi-autonomous driving when a potential spoofing event has been detected. In addition to providing other parameters for platoon selection or joining when the request to join is transmitted to the PCS, the source vehicle may not or need not join a platoon unless a potential spoofing event has been detected. Generally, vehicles that share a common destination or heading, velocities, travel preference, autonomy level, occupancy situations, and other parameters may request to join a platoon at the PCS server, which then identifies a suitable platoon for the vehicle based on these specified parameters. According to the present disclosure, each vehicle may first determine whether its location is spoofed, such as by known techniques, including comparing its GNSS fix with onboard sensor outputs or using the correlation from V2X messages received from other vehicles, before determining to request to join a platoon.

Upon determining that its location is spoofed, the source vehicle may additionally indicate the detection of the spoofing event to the PCS, along with the request to join a platoon. Furthermore, the vehicle may include the confidence metric indicating the probability that its location is spoofed. The PCS may use the indicated detection of the spoofing event and/or the confidence metric, along with the vehicle type (Autonomous, ADAS) to prioritize a platoon assignment for autonomous vehicles under a possible spoof attack. The assignment allows the source vehicle to join a platoon and to use the lead vehicle's instruction then for taking v2X related decisions, thus avoiding to use the potentially spoofed location information. The PCS may also ensure that no v2X messages are transmitted from the source vehicle under a possible spoof attack.

The source vehicle may continue to monitor its location information with other sensor information (e.g., accelerometer, inertia measurement units, or receiver receiving messages from other devices). If and once the confidence metric improves (e.g, decreases below the threshold value), the source UE may indicate to the PCS that the spoofing attack is over for further arrangements with the platoon. For example, if there is another spoofed vehicle awaiting platoon assignment while the source UE no longer needs platooning to ensure safety, the PCS may let the source UE to leave the platoon to accept the awaiting UE to the platoon.

In some cases, the PCS may send alerts to the source vehicle to take manual control until a platoon assignment is done. For example, before the lead vehicle is able to manage the source vehicle as a member of the platoon, the alerts may help users in the source vehicle to take actions, such as be engaging manual operations, to avoid accidents to be caused by the spoofed location information. The PCS may send alerts in situations when there is no available platoon to assign and in situations when platoon assignment is delayed or involves an expected time period for completion.

When the lead vehicle has detected potential spoofing events, both the lead vehicle and the PCS may take actions to enhance safety. In a platoon, the designated lead vehicle sends V2X BSM indications to the member vehicles in the platoon, as well as the PCS. Whenever the lead vehicle needs to send the BSM indication, the lead vehicle may first determine whether its location is spoofed, such as by determining if the confidence metric exceeds the threshold value. Upon detecting a spoofing event, the lead vehicle may designate one or more member vehicles as secondary vehicles, one of which may further be designated as a new lead vehicle. The current lead vehicle communicates with the secondary vehicles to validate the location information (of the lead vehicle) before tagging in the location in the BSM indication. If the validation fails, the lead vehicle may indicate the possible spoofing and the confidence metric to the PCS.

Knowing that the current lead vehicle has detected a spoofing event, the PCS may request the one or more secondary vehicles to send their location information. The PCS may then determine one of the secondary vehicle to be the new lead vehicle based on comprehensive considerations, including whether the new lead vehicle may be compromised with spoofed location information. In some cases, instead of or in addition to the PCS assigning the new lead vehicle, the current lead vehicle may negotiate with the secondary vehicles in the platoon to identify and/or designate a new lead vehicle.

When the spoofing attack negatively affects a group of vehicles, including one or more vehicles of the same platoon, the PCS or the lead vehicle may dis-integrate the current platoon for safety considerations. For example, when multiple vehicles of the same platoon are determined to be possibly spoofed (such as by individually examining own confidence metric, and cross-examining the location information of other vehicles in the same platoon), to continue platooning at close distances may be dangerous. As such, the PCS may decide to dis-integrate the platoon and indicate to the respective vehicles to leave the platoon. In some cases, the lead vehicle may signal to the rest of the member vehicles in the platoon to leave the platoon.

Regardless if the platoon is dis-integrated, each of the existing platoon vehicles may continue to indicate the confidence metric to the PCS. As the PCS determines that the confidence metrics of the vehicles improve, the PCS may re-assign a suitable platoon for the dis-integrated vehicles. Such dis-integration techniques may ensure that vehicles under a possible spoofing attack would not platoon in close proximity with each other or operate autonomously nearby other vehicles.

In some aspects, the occupancy parameter may include a number of passengers of the first vehicle (i.e., the source vehicle that requesting to join a platoon) associated with the source UE. The travel preference parameter may include at least one of a lane position in available lanes. Very often, there are dedicated lanes for car pools, such as high occupancy vehicle (HOV) lanes. Such dedicated lanes allow only for cars carrying two or more people for improving travel efficiency. Therefore, a platoon of vehicles may take advantage of the HOV lanes if each member vehicle of the platoon includes two or more passengers.

Using the occupancy parameter enables the first vehicle to inform the PCS to look up a suitable platoon that satisfies the car pool criteria. For example, the platoon accepting the first vehicle has vehicles that each has a same or comparable occupancy parameter as the first vehicle. As a result, an HOV platoon may be created to further enhance travel efficiency by coordinating high occupancy vehicles to travel in less congested lane(s), such as the HOV lane. In some implementations, the existing vehicles in the platoon may have an allowable deviation for the occupancy parameter as the first vehicle. For example, the occupancy parameter may be set to be between three and four, such that vehicles having both three passengers and four passengers onboard may form a platoon.

On the other hand, some autonomous or semi-autonomous vehicles may not include any passengers and are nonetheless operable to join a platoon. A vehicle platoon may prioritize vehicles with passengers over vehicles without passengers when forming a platoon. For example, fully autonomous vehicles may not carry passengers all the time. In this case a field value of '0' may indicate that the vehicle currently carries no passenger and should join a platoon that has other non-occupied vehicles. In some implementations, the vehicles that do not carry passengers may be used as a safety buffer and placed in the front of a platoon having vehicles that carry passengers.

In some aspects, a reserved value of the occupancy parameter may be used to indicate the autonomy level of the first vehicle. For example, if the first vehicle has no passenger on board, the occupancy parameter of "0" may be used to indicate the full autonomy of the first vehicle. This information can later be used in the current accident and collision avoidance algorithms where cars with passengers are prioritized over other non-passenger carrying vehicles to eliminate/minimize the number of human casualties.

In some aspects, the occupancy parameter may further include a seat position of each passenger of the first vehicle. Because the seat position often relates to a safety factor in collision, the seat position can be used to make critical decisions in order to minimize fatalities or injuries in accidents. For example, because platooning is often used in autonomous or semi-autonomous vehicles, some vehicles may not have passengers in the front row. Vehicles having passengers in the front row may need greater headways for safety concerns. Therefore, the present disclosure allows for coordinating vehicles in platoons by grouping vehicles of similar seating positions together.

In some aspects, the vehicle platoon includes vehicles having the same autonomy level as the first vehicle. The autonomy of the first vehicle can be one of: fully autonomous control, semi-autonomous control, or manual control. The autonomous level information can be used to enhance the platooning performance by minimizing the inter-vehicle distance in the platoons. For example: vehicles with fully autonomous capabilities may be grouped together. These vehicles may move in a platoon with much closer distance or lesser headways than vehicles without fully autonomous capabilities. Similarly, vehicles with semi-autonomous capability and manual vehicles may be grouped in another platoon, where the distance between the moving vehicles would be kept relatively larger to account for manual reaction time when braking or human supervision maneuvers, such as when information alert is provided in the ADAS instrument panel.

In some embodiments, a vehicle platoon may include a mix of fully autonomous and manual/semi-autonomous vehicles. The same platoon may arrange the order of the mixed vehicles such that fully autonomous vehicles are positioned in succession while maintaining a minimal distance, and the semi-autonomous/manual vehicles are separately grouped in succession while maintaining a relatively larger inter-vehicle distance. As such, the overall efficiency can be improved by minimizing the distance between the vehicles in the platoon and not compromising safety margins (e.g., allowing for sufficient headways for semi-autonomous and manual vehicles).

In some aspects, the travel preference parameter includes a preferred speed of the first vehicle. The preferred speed of the first vehicle may be selected by the driver, calculated based on time of arrival, or determined based on traffic regulation or safety concerns. The preferred speed may or may not be accepted by the platoon receiving the request. In some cases, a PCS may select, when there are more than one platoon available, a platoon that may accommodate the preferred speed and forwards the request to the lead vehicle of the selected platoon. If the selected platoon is already traveling at a speed that is similar to or the same as the preferred speed, the lead vehicle may accept the request. But if the selected platoon is traveling at a different speed, the lead vehicle may decline the request.

When the platoon declines the requested preferred speed, the first vehicle and its associated UE may receive a response message that indicates the first vehicle being allowed to join the platoon at a different speed than the preferred speed. In some cases, the source UE may decline to join the vehicle platoon at the different speed in the response message. In some cases, the source UE may negotiate yet a different speed with the platoon. For example, the source UE may indicate a credit to redeem to join the platoon at the preferred speed, such as when the credit may be sufficient to have the platoon to change the speed to the preferred speed. In some cases, other priority criteria, besides credit, may be used for negotiation. For example, vehicle type of autonomy, commercial purpose, or emergency response, may be used as priority criteria for negotiating an acceptable speed of the platoon. When the first vehicle negotiates with the platoon, the lead vehicle of the platoon may further negotiate with other member vehicles of the platoon. As part of this negotiation, the platoon may increase or decrease the speed of the platoon along with the requesting vehicle to arrive at a negotiated speed value.

Aspects of the present disclosure may provide one or more potential advantages, such as helping comply with different rules to drive vehicles on certain lanes based on car's occupancy, better accident avoidance system eliminating/minimizing the number of human casualties, enhanced platooning with minimizing the distance between the vehicles based on their capabilities, and/or inclusion of the speed of vehicle would ensure a more appropriate assignment of platoon to the incoming vehicle based on its preference.

Figure 13:
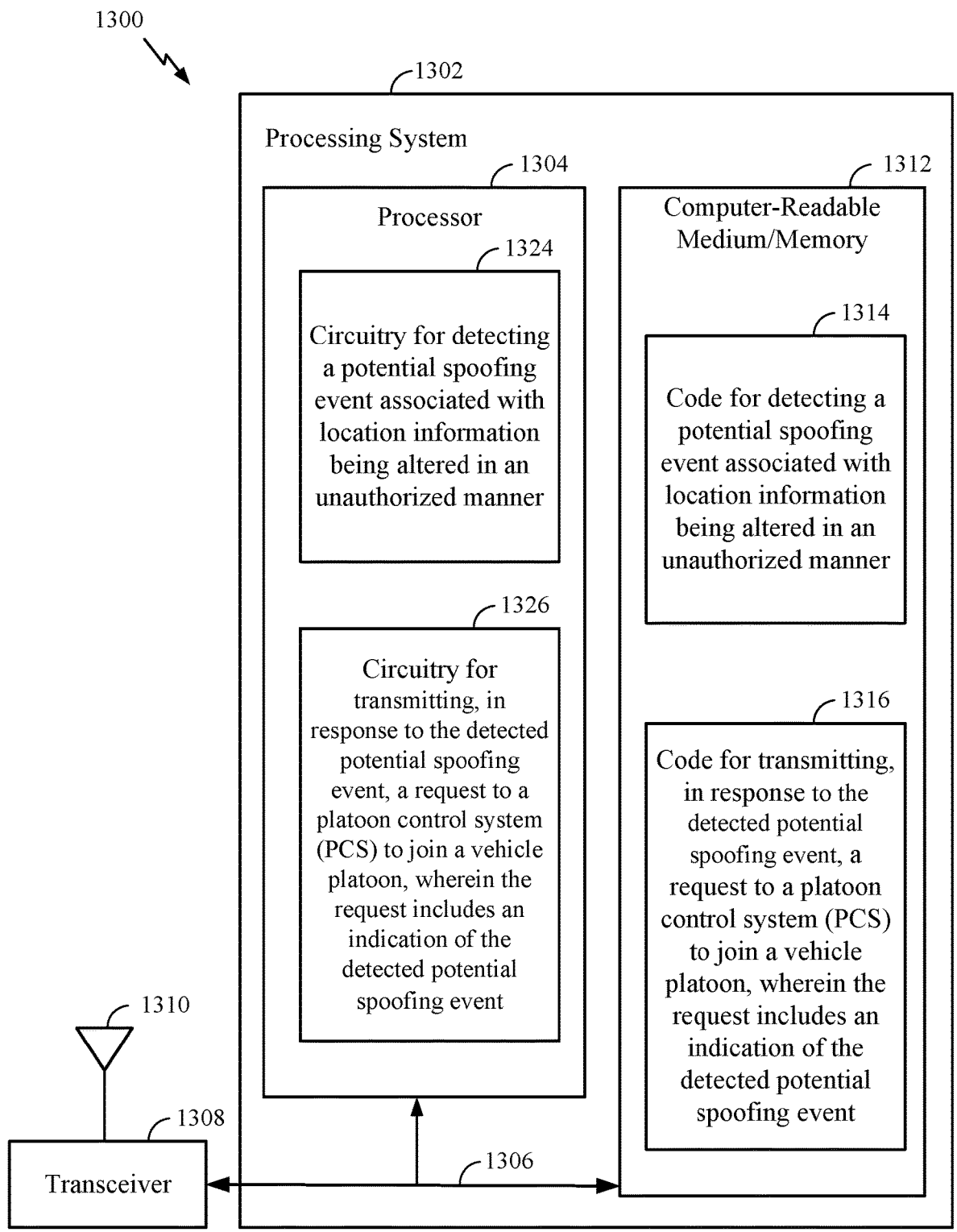
FIGS. 13-14 illustrate communications devices that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 7. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 7, or other operations for performing the various techniques discussed herein for ensuring compatibility between network slice operating frequencies and UE radio capabilities. In certain aspects, computer-readable medium/memory 1312 stores code 1314 for detecting a potential spoofing event associated with location information being altered in an unauthorized manner; and code 1316 for transmitting, in response to the detected potential spoofing event, a request to a platoon control system (PCS) to join a vehicle platoon, wherein the request includes an indication of the detected potential spoofing event.

In certain aspects, the processor 1304 has circuitry configured to implement the code stored in the computer-readable medium/memory 1312. The processor 1304 includes circuitry 1324 for detecting a potential spoofing event associated with location information being altered in an unauthorized manner; and circuitry 1326 for transmitting, in response to the detected potential spoofing event, a request to a platoon control system (PCS) to join a vehicle platoon, wherein the request includes an indication of the detected potential spoofing event.

Figure 14:
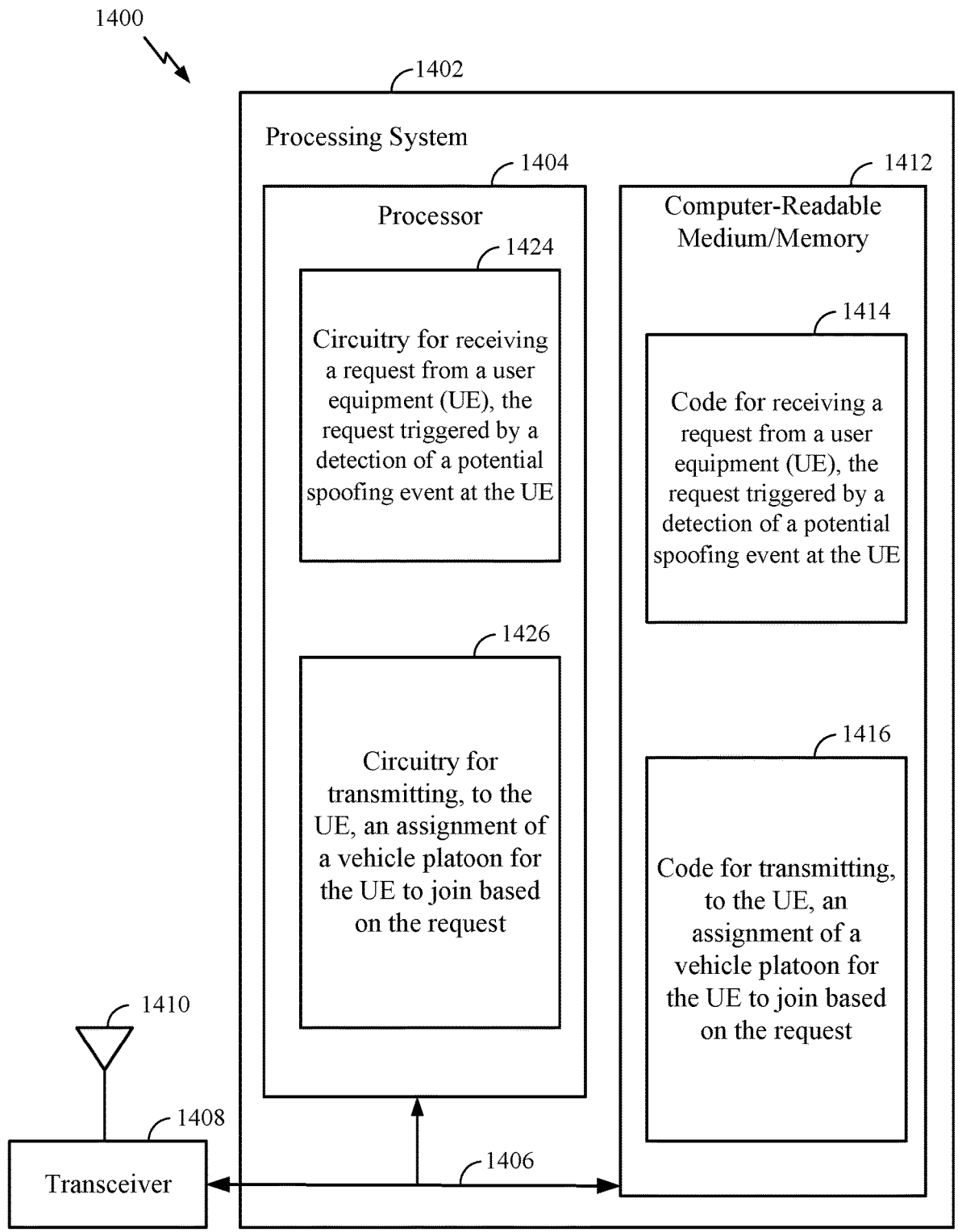

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein for ensuring compatibility between network slice operating frequencies and UE radio capabilities. In certain aspects, computer-readable medium/memory 1412 stores code 1414 for transmitting, in response to the detected potential spoofing event, a request to a platoon control system (PCS) to join a vehicle platoon, wherein the request includes an indication of the detected potential spoofing event; and code 1416 for transmitting, to the UE, an assignment of a vehicle platoon for the UE to join based on the request.

In certain aspects, the processor 1404 has circuitry configured to implement the code stored in the computer-readable medium/memory 1412. The processor 1404 includes circuitry 1424 for receiving a request from a user equipment (UE), the request triggered by a detection of a potential spoofing event at the UE; and circuitry 1426 for transmitting, to the UE, an assignment of a vehicle platoon for the UE to join based on the request.

Figure 15:
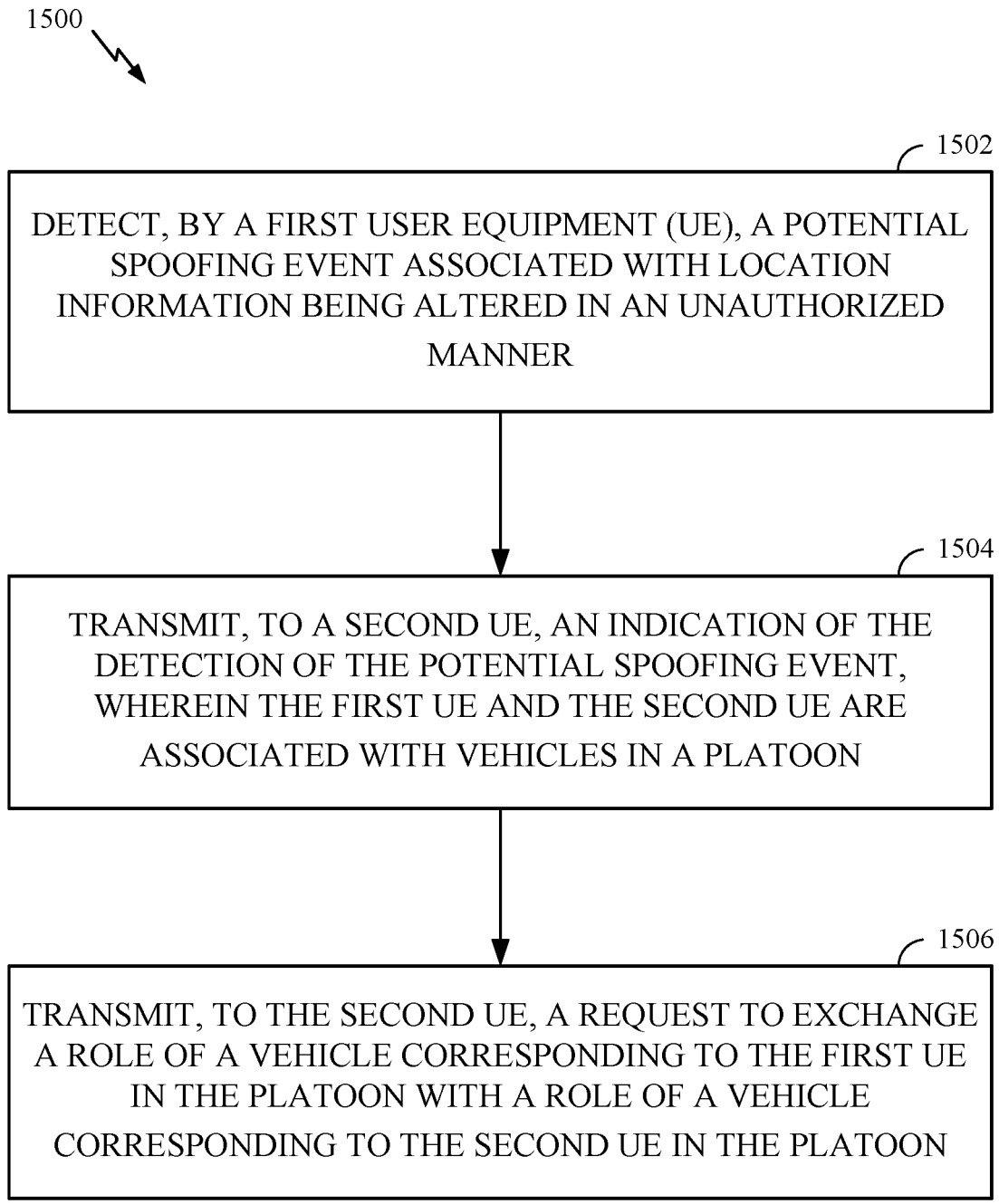
FIG. 15 is a flow diagram illustrating example operations for wireless communication by a first UE, in accordance with certain aspects of the present disclosure.

Example Vehicle Operations Against Location Spoofing Attacks in a Platoon Vehicle FIG. 15 is a flow diagram illustrating example operations 1500 for wireless communication by a first UE, such as a UE associated with a vehicle platoon, in accordance with certain aspects of the present disclosure. The operations 1500 may be performed, for example, by a UE of a lead vehicle (e.g., the UE 120*a* in the wireless communication network 100). The operations 1500 may be implemented as software components that are executed and run on one or more processors (e.g., controller/processor 280 of FIG. 2). Further, the transmission and reception of signals by the UE in operations 1500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1500 begin, at 1502, by detecting a potential spoofing event associated with location information being altered in an unauthorized manner. Similar to the detection in the operations 700, the detection of the potential spoofing event may be based on a confidence metric. The confidence metric may be associated with a position accuracy based on a verification of global navigation satellite system (GNSS) position information received at the first UE. When the confidence metric is above a threshold value and indicating a predefined level of certainty, the first UE determines that a potential spoofing event has been detected. The confidence metric is not required, as other conditions (e.g., receiving a warning from another device) may also trigger a determination of a potential spoofing event.

At 1504, the first UE transmits, to a second UE, an indication of the detection of the potential spoofing event. The second UE is associated with another vehicle in the same platoon the first UE is associated with. In some cases, the indication may be carried in one or more basic safety messages (BSMs). In some cases, the indication may be transmitted along with other sidelink communications, such as physical sidelink shared channel (PSSCH) or physical sidelink feedback channel (PSFCH).

At 1506, the first UE transmits, to the second UE, a request to exchange a role of a vehicle corresponding to the first UE in the platoon with a role of a vehicle corresponding to the second UE in the platoon. For example, the role of the vehicle corresponding to the first UE is a lead vehicle managing UEs of other vehicles in the platoon, and the role of the vehicle corresponding to the second UE is a secondary vehicle managed by the lead vehicle. Before transmitting the request or exchanging the roles, the PCS or the first UE may first verify that the second UE has not detected any potential spoofing events using similar techniques (e.g., via onboard sensors, RSU feedback, etc.). For example, the first UE may request from the second UE a second confidence metric. The first UE may proceed with transmitting the request or exchanging the roles when the second confidence metric is below the threshold. When the second confidence metric exceeds the threshold, however, the first UE may instead transmit to the second UE an indication to leave the platoon.

Figure 16:
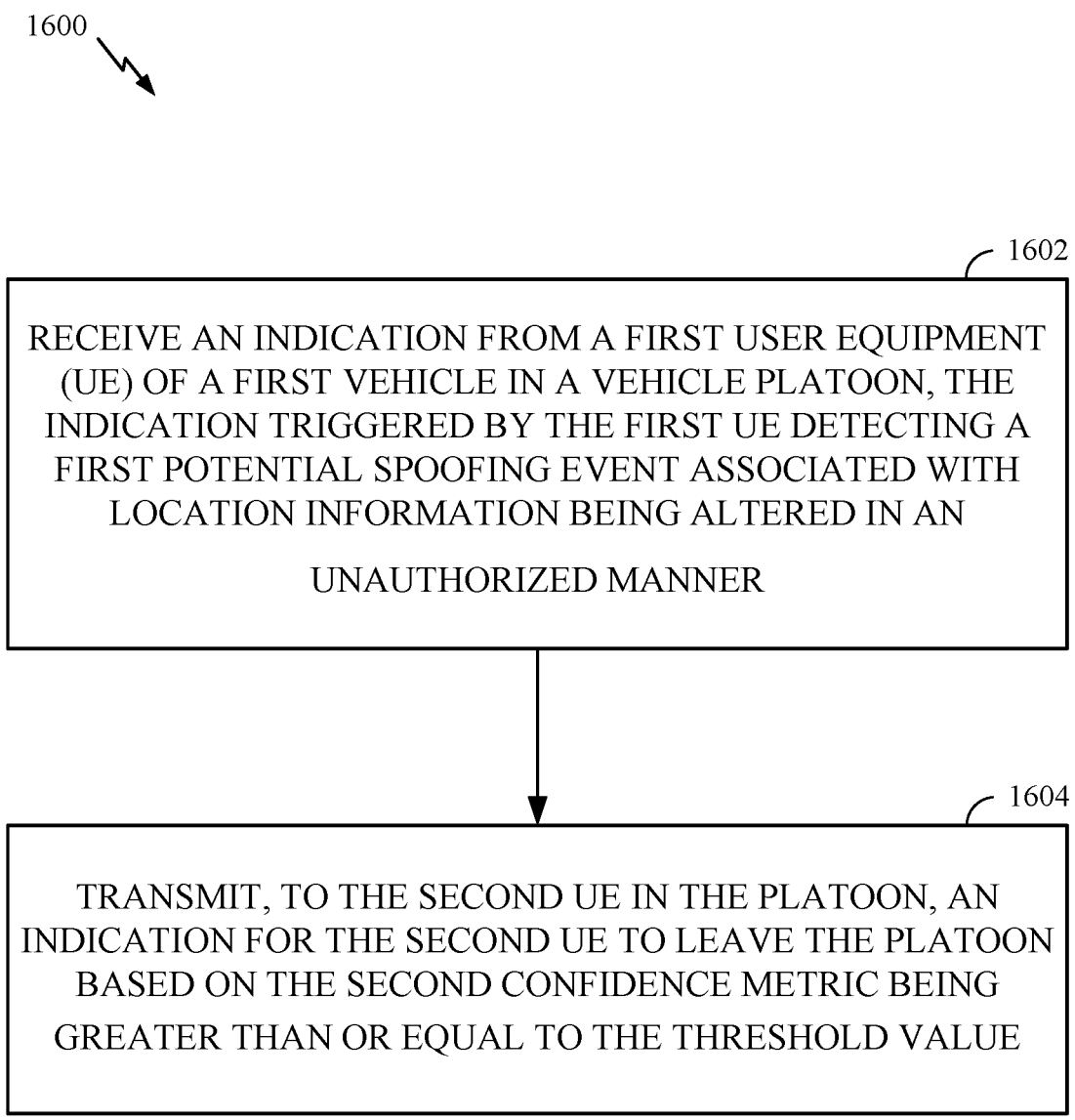
FIG. 16 is a flow diagram illustrating example operations for wireless communication by a network entity, in accordance with certain aspects of the present disclosure.

FIG. 16 is a flow diagram illustrating example operations 1600 for wireless communication that may be considered complimentary to the operations 1500 For example, operations 1600 may be performed, by a PCS and responding to a request from a first UE performing operations 1500 of FIG. 15. The operations 1600 may be implemented as software components that are executed and run on one or more processors (e.g., controller/processor 240 of FIG. 2). Further, the transmission and reception of signals by the PCS in operations 1600 may be enabled, for example, by one or more antennas (e.g., antennas 234 of FIG. 2). In certain aspects, the transmission and/or reception of signals by the PCS may be implemented via a bus interface of one or more processors (e.g., controller/processor 240) obtaining and/or outputting signals.

The operations 1600 begin, at 1602, by receiving an indication from a first UE of a first vehicle in a vehicle platoon, the indication triggered by the first UE detecting a first potential spoofing event associated with location information being altered in an unauthorized manner. For example, the first UE is a lead UE configured to perform functionalities including management of other UEs in the vehicle platoon. Similar to the detection of the potential spoofing event of operations 1500, the first potential spoofing event is determined based on that a first confidence metric of the first UE indicating a probability that the first UE is receiving spoofed location information is above a threshold value.

At 1604, operations 1600 continue by transmitting, to a second UE in the vehicle platoon, an indication for the second UE to assume functionalities performed by the first UE in the vehicle platoon. For example, the second UE and the first UE are in sidelink communication, and the second UE is managed by the first UE before the indication of the first potential spoofing event.

In aspects, the PCS may transmit, upon receiving the indication from the first UE, to the second UE, a request for location information and a second confidence metric of the second UE, the second confidence metric indicating a probability that the second UE is receiving spoofed location information. The PCS may further receive, from the second UE, the location information and the second confidence metric of the second UE. In some cases, the PCS may first determine that the second confidence metric is below the threshold value, indicating the second UE being free from a spoofing attack before transmitting to the second UE the indication for the second UE to assume the functionalities performed by the first UE.

In aspects, the PCS may transmit, to the first UE, a request to leave the vehicle platoon; and transmit, to the second UE, a request to leave the vehicle platoon based on the second confidence metric being also above the threshold value. In some cases, the PCS may dis-integrate the platoon if there are insufficient number of vehicles remaining in the platoon or suitable to be designated as the new lead vehicle after the first UE and the second UE have left the platoon.

Figure 17:
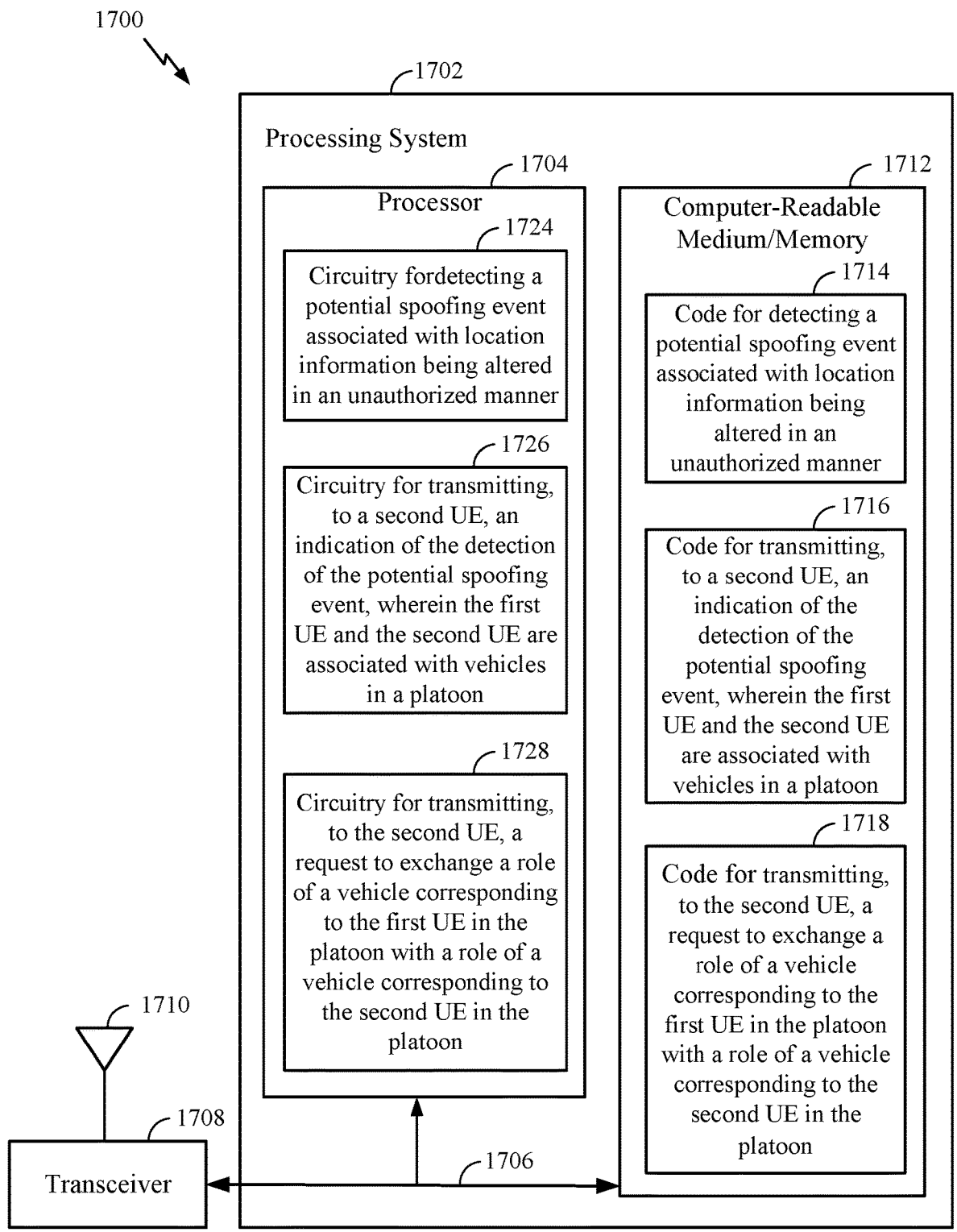
FIGS. 17-18 illustrate communications devices that may include various components configured to perform operations for the techniques disclosed herein in accordance with aspects of the present disclosure.

FIG. 17 illustrates a communications device 1700 that may include various components (e.g., corresponding to means-plus-function components) configured to perform operations for the techniques disclosed herein, such as the operations illustrated in FIG. 15. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 15, or other operations for performing the various techniques discussed herein for ensuring compatibility between network slice operating frequencies and UE radio capabilities. In certain aspects, computer-readable medium/memory 1712 stores code 1714 for detecting a potential spoofing event associated with location information being altered in an unauthorized manner; code 1716 for transmitting, to a second UE, an indication of the detection of the potential spoofing event, wherein the first UE and the second UE are associated with vehicles in a platoon; and code 1718 for transmitting, to the second UE, a request to exchange a role of a vehicle corresponding to the first UE in the platoon with a role of a vehicle corresponding to the second UE in the platoon.

In certain aspects, the processor 1704 has circuitry configured to implement the code stored in the computer-readable medium/memory 1712. The processor 1704 includes circuitry 1724 for detecting a potential spoofing event associated with location information being altered in an unauthorized manner; circuitry 1726 for transmitting, to a second UE, an indication of the detection of the potential spoofing event, wherein the first UE and the second UE are associated with vehicles in a platoon; and circuitry 1728 for transmitting, to the second UE, a request to exchange a role of a vehicle corresponding to the first UE in the platoon with a role of a vehicle corresponding to the second UE in the platoon.

Figure 18:
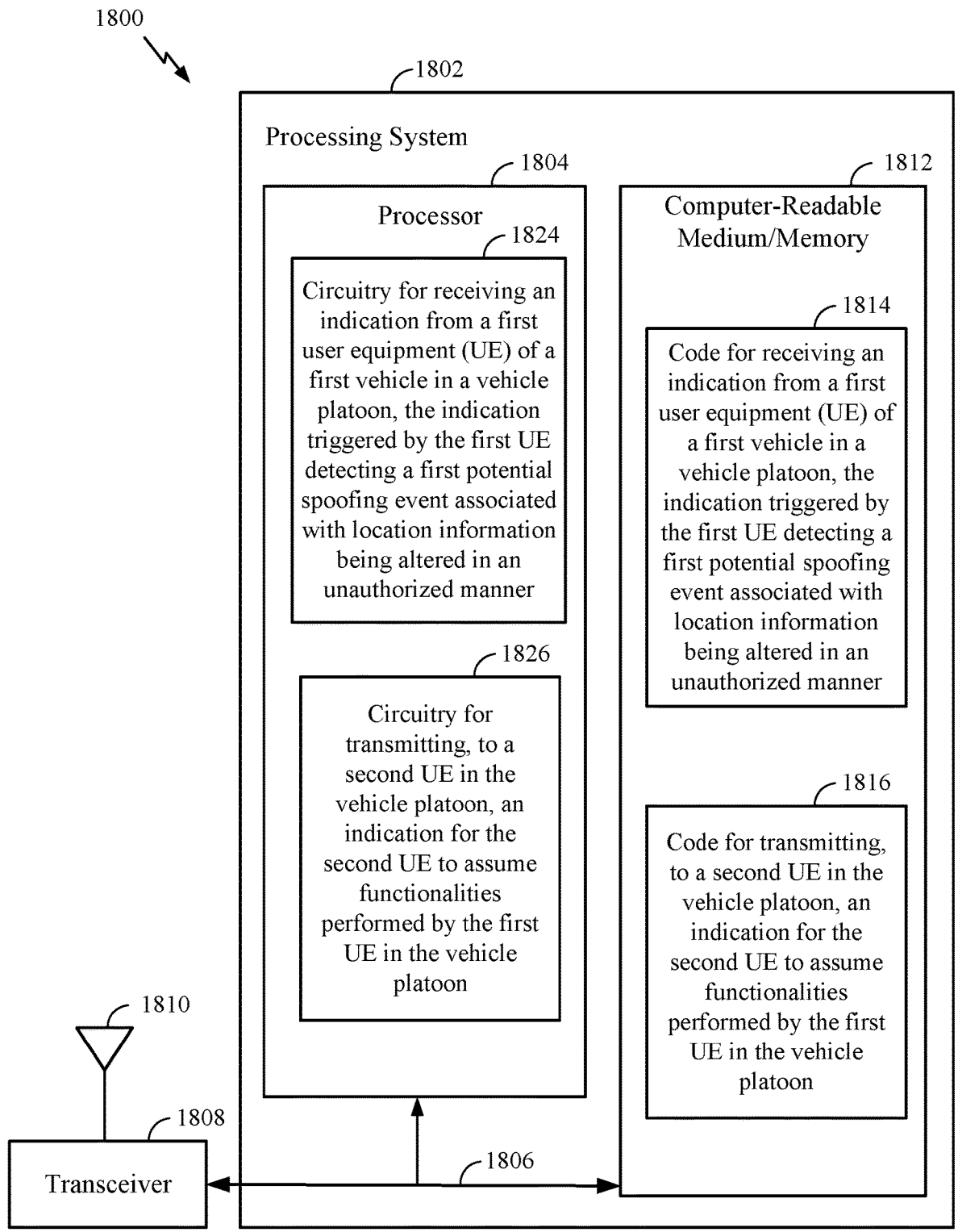

FIG. 18 illustrates a communications device 1800 that may include various components (e.g., corresponding to means-plus-function components) configured to perform operations for the techniques disclosed herein, such as the operations illustrated in FIG. 16. The communications device 1800 includes a processing system 1802 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 16, or other operations for performing the various techniques discussed herein for ensuring compatibility between network slice operating frequencies and UE radio capabilities. In certain aspects, computer-readable medium/memory 1812 stores code 1814 for receiving an indication from a first UE of a first vehicle in a vehicle platoon, the indication triggered by the first UE detecting a first potential spoofing event associated with location information being altered in an unauthorized manner; and code 1816 for transmitting, to a second UE in the vehicle platoon, an indication for the second UE to assume functionalities performed by the first UE in the vehicle platoon.

In certain aspects, the processor 1804 has circuitry configured to implement the code stored in the computer-readable medium/memory 1812. The processor 1804 includes circuitry 1824 for receiving an indication from a first UE of a first vehicle in a vehicle platoon, the indication triggered by the first UE detecting a first potential spoofing event associated with location information being altered in an unauthorized manner; and circuitry 1826 for transmitting, to a second UE in the vehicle platoon, an indication for the second UE to assume functionalities performed by the first UE in the vehicle platoon.

Example Aspects

Aspect 1: A method for wireless communications by a source user equipment (UE), comprising: detecting a potential spoofing event associated with location information being altered in an unauthorized manner; and transmitting, in response to the detected potential spoofing event, a request to a platoon control system (PCS) to join a vehicle platoon, wherein the request includes an indication of the detected potential spoofing event.

Aspect 2: The method of Aspect 1, wherein the request to the PCS comprises a confidence metric that indicates a probability that the source UE is receiving spoofed location information.

Aspect 3: The method of Aspect 2, wherein detecting the potential spoofing event comprises detecting that the confidence metric is above a threshold value.

Aspect 4: The method of Aspect 2 or 3, wherein the confidence metric indicates one of a plurality of levels of accuracy of a corresponding level of certainty of the potential spoofing event, and wherein the threshold value corresponds to a predefined level of accuracy.

Aspect 5: The method of any one of Aspects 2 to 4, wherein detecting the potential spoofing event comprises receiving one or more signals from at least one of a network entity or a second UE in one or more basic safety messages (BSMs).

Aspect 6: The method of Aspect 5, wherein the confidence metric is determined by comparing at least one characteristic indicated by the one or more signals and the characteristic indicated by received location information.

Aspect 7: The method of any one of Aspects 2 to 6, wherein detecting the potential spoofing event comprises measuring, using at least one onboard sensor independent from the location information, a movement attribute of the source UE to examine a validity of the location information.

Aspect 8: The method of any one of Aspects 2 to 7, wherein the request further comprises at least one of: a vehicle identifier, destination information, or a source positioning location.

Aspect 9: The method of any one of Aspects 1 to 8, wherein the request further indicates at least one of: an occupancy parameter of a vehicle associated with the source UE; an autonomy level of a vehicle associated with the UE; or a travel preference parameter.

Aspect 10: The method of any one of Aspects 1 to 9, further comprising: receiving a response indicating confirmation that the source UE is allowed to join a vehicle platoon assigned by the PCS.

Aspect 11: The method of Aspect 10, further comprising: receiving an invitation corresponding to the confirmation from a lead UE of a lead vehicle of the vehicle platoon.

Aspect 12: The method of Aspect 10, further comprising abstaining from transmitting vehicle-to-everything (V2X) messages upon receiving the response.

Aspect 13: The method of any one of Aspects 1 to 12, further comprising: receiving an alert notice from the PCS when the PCS does not have an available vehicle platoon to assign.

Aspect 14: The method of Aspect 13, wherein the alert notice comprises alert messages requesting manual control.

Aspect 15: A method for wireless communications by a network entity, comprising: receiving a request from a user equipment (UE), the request triggered by a detection of a potential spoofing event at the UE; and transmitting, to the UE, an assignment of a vehicle platoon for the UE to join based on the request.

Aspect 16: The method of Aspect 15, wherein the request further includes a confidence metric that indicates a probability that the UE is receiving spoofed location information of the potential spoofing event.

Aspect 17: The method of Aspect 15 or 16, wherein the request comprises at least one of: a vehicle identifier, destination information, a source positioning location, or the confidence metric.

Aspect 18: The method of any one of Aspects 15 to 17, wherein the assignment has a higher priority when the UE is associated with an autonomous vehicle than when the UE is associated with a non-autonomous vehicle.

Aspect 19: The method of any one of Aspects 15 to 18, further comprising, transmitting, to at least one platoon UE of a corresponding vehicle in the vehicle platoon, an instruction for the at least one platoon UE to transmit a beacon to the UE, wherein the beacon is to be measured by the UE.

Aspect 20: The method of any one of Aspects 15 to 19, further comprising, transmitting, to a roadside unit (RSU), an instruction for the RSU to measure a location of the UE for comparison with location information therein and assessment of the potential spoofing event.

Aspect 21: The method of Aspect 20, further comprising confirming the assignment of the vehicle platoon based on the location measured by the RSU.

Aspect 22: A method for wireless communication by a first user equipment (UE), comprising: detecting a potential spoofing event associated with location information being altered in an unauthorized manner; transmitting, to a second UE, an indication of the detection of the potential spoofing event, wherein the first UE and the second UE are associated with vehicles in a platoon; and transmitting, to the second UE, a request to exchange a role of a vehicle corresponding to the first UE in the platoon with a role of a vehicle corresponding to the second UE in the platoon.

Aspect 23: The method of Aspect 22, wherein the indication is carried in one or more basic safety messages (BSMs).

Aspect 24: The method of Aspect 22, wherein the role of the vehicle corresponding to the first UE is a lead vehicle managing UEs of other vehicles in the platoon, and wherein the role of the vehicle corresponding to the second UE is a secondary vehicle managed by the lead vehicle.

Aspect 25: The method of Aspect 22, wherein detecting the potential spoofing event comprises determining a first confidence metric of the first UE, the first confidence metric associated with a position accuracy based on a verification of global navigation satellite system (GNSS) position information received at the first UE.

Aspect 26: The method of Aspect 25, wherein detecting the potential spoofing event further comprises determining that the first confidence metric indicating a probability that the first UE is receiving spoofed location information is above a threshold value.

Aspect 27: The method of Aspect 25, further comprising, receiving from at least the second UE, data of sensors thereof, wherein the verification of the GNSS position information is based on the data of sensors.

Aspect 28: The method of Aspect 25, further comprising, receiving data from a roadside unit (RSU), wherein the verification of the GNSS position information is further based on the data of the RSU.

Aspect 29: The method of Aspect 25, further comprising: transmitting, an indication of the potential spoofing event, to a platoon control system (PCS) in control of the platoon when the confidence metric is above a threshold value.

Aspect 30: The method of Aspect 25, further comprising: requesting, from the second UE in the platoon, a second confidence metric of the second UE, the second confidence metric indicating a probability that the second UE is receiving spoofed location information, wherein transmitting the request to exchange roles in the platoon is based on the second confidence metric being below the threshold value and indicating an absence of spoofing attack to the second UE.

Aspect 31: The method of Aspect 30, further comprising: transmitting, to the second UE in the platoon, an indication for the second UE to leave the platoon based on the second confidence metric being greater than or equal to the threshold value.

Aspect 32: A method for wireless communications by a network entity, comprising: receiving an indication from a first user equipment (UE) of a first vehicle in a vehicle platoon, the indication triggered by the first UE detecting a first potential spoofing event associated with location information being altered in an unauthorized manner; and transmitting, to a second UE in the vehicle platoon, an indication for the second UE to assume functionalities performed by the first UE in the vehicle platoon.

Aspect 33: The method of Aspect 32, wherein the first UE is a lead UE configured to perform functionalities including management of other UEs in the vehicle platoon.

Aspect 34: The method of Aspect 32, wherein the second UE and the first UE are in sidelink communication, and the second UE is managed by the first UE before the indication of the first potential spoofing event.

Aspect 35: The method of Aspect 32, wherein the first potential spoofing event is determined based on that a first confidence metric of the first UE indicating a probability that the first UE is receiving spoofed location information is above a threshold value.

Aspect 36: The method of Aspect 35, further comprising: transmitting, upon receiving the indication from the first UE, to the second UE, a request for location information and a second confidence metric of the second UE, the second confidence metric indicating a probability that the second UE is receiving spoofed location information; and receiving, from the second UE, the location information and the second confidence metric of the second UE.

Aspect 37: The method of Aspect 36, wherein transmitting to the second UE the indication for the second UE to assume the functionalities performed by the first UE comprises determining that the second confidence metric is below the threshold value, indicating the second UE being free from a spoofing attack.

Aspect 38: The method of Aspect 35, further comprising: transmitting, to the first UE, a request to leave the vehicle platoon; and transmitting, to the second UE, a request to leave the vehicle platoon based on the second confidence metric being also above the threshold value.

Aspect 39: The method of Aspect 38, further comprising: monitoring for updates of the first confidence metric of the first UE and the second confidence metric of the second UE; and transmitting, a corresponding platoon joining assignment to at least the first UE or the second UE when one of the first confidence metric or the second confidence metric becomes below the threshold value.

Aspect 40: An apparatus for wireless communications, comprising means for performing one or more of the methods of Aspects 1-39.

Aspect 41: An apparatus for wireless communications, comprising: a memory; and a processor coupled to the memory, the memory and the processor configured to perform the method of one or more of Aspects 1-39.

Aspect 42: A computer-readable medium, the medium including instructions that, when executed by a processing system, cause the processing system to perform the method of one or more of Aspects 1-39.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7, 8, 15, and/or 16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A source user equipment (UE) for wireless communications, comprising:
one or more processors individually or collectively configured to execute instructions stored on one or more memories and to cause the source UE to:
detect a potential spoofing event associated with location information being altered in an unauthorized manner; and
transmit, in response to the detected potential spoofing event, a request to a platoon control system (PCS) to join a vehicle platoon, wherein the request includes:
a confidence metric that indicates a probability that the source UE has received spoofed location information; and
at least one of:
an occupancy parameter of a vehicle associated with the source UE; or
an autonomy level of a vehicle associated with the source UE.

2. The source UE of claim 1, wherein the one or more processors are further configured to cause the source UE to detect the potential spoofing event by detecting that the confidence metric is above a threshold value.

3. The source UE of claim 1 wherein the confidence metric indicates one of a plurality of levels of accuracy of a corresponding level of certainty of the potential spoofing event, and wherein a threshold value corresponds to a predefined level of accuracy.

4. The source UE of claim 1, wherein the one or more processors are configured to cause the source UE to detect the potential spoofing event by receiving one or more signals from at least one of a network entity or a second UE in one or more basic safety messages (BSMs).

5. The source UE of claim 4, wherein the confidence metric is determined by comparing at least one characteristic indicated by the one or more signals and a characteristic indicated by received location information.

6. The source UE of claim 1, wherein the one or more processors are further configured to cause the source UE to detect the potential spoofing event by measuring, using at least one onboard sensor independent from the location information, a movement attribute of the source UE to examine a validity of the location information.

7. The source UE of claim 1, wherein the request further comprises at least one of:
a vehicle identifier,
destination information, or
a source positioning location.

8. The source UE of claim 1, wherein the request further indicates travel preference parameter.

9. The source UE of claim 1, wherein the one or more processors are further configured to cause the source UE to:
receive a response indicating confirmation that the source UE is allowed to join a vehicle platoon assigned by the PCS;
receive an invitation corresponding to the confirmation from a lead UE of a lead vehicle of the vehicle platoon; and
abstain from transmitting vehicle-to-everything (V2X) messages upon receiving the response.

10. The source UE of claim 1, wherein the one or more processors are further configured to cause the source UE to:
receive an alert notice from the PCS when the PCS does not have an available vehicle platoon to assign, wherein the alert notice comprises alert messages requesting manual control.

11. A network entity for wireless communications, comprising:
one or more processors individually or collectively configured to execute instructions stored on one or more memories and to cause the network entity to:
receive, from a user equipment (UE), a request to join a vehicle platoon, wherein the request includes:
a confidence metric that indicates a probability that the UE has received spoofed location information; and
at least one of:
an occupancy parameter of a vehicle associated with the UE; or
an autonomy level of a vehicle associated with the UE; and
transmit, to the UE, an assignment of the vehicle platoon for the UE to join based on the request.

12. The network entity of claim 11, wherein the request comprises at least one of: a vehicle identifier, destination information, a source positioning location, or the confidence metric.

13. The network entity of claim 11, wherein the assignment has a higher priority when the UE is associated with an autonomous vehicle than when the UE is associated with a non-autonomous vehicle.

14. The network entity of claim 11, wherein the one or more processors further are configured to cause the network entity to:
transmit, to at least one platoon UE of a corresponding vehicle in the vehicle platoon, an instruction for the at least one platoon UE to transmit a beacon to the UE, wherein the beacon is to be measured by the UE.

15. The network entity of claim 11, wherein the one or more processors further are configured to cause the network entity to:
transmit, to a roadside unit (RSU), an instruction for the RSU to measure a location of the UE for comparison with location information therein; and
confirm the assignment of the vehicle platoon based on the location measured by the RSU.

16. A method for wireless communication by a source user equipment (UE), comprising:
detecting a potential spoofing event associated with location information being altered in an unauthorized manner; and
transmitting, in response to the detected potential spoofing event, a request to a platoon control system (PCS) to join a vehicle platoon, wherein the request includes:
a confidence metric that indicates a probability that the source UE has received spoofed location information; and
at least one of:
an occupancy parameter of a vehicle associated with the source UE; or
an autonomy level of a vehicle associated with the source UE.

17. The method of claim 16, wherein detecting the potential spoofing event comprises detecting that the confidence metric is above a threshold value.

18. The method of claim 16, wherein the confidence metric indicates one of a plurality of levels of accuracy of a corresponding level of certainty of the potential spoofing event, and wherein a threshold value corresponds to a predefined level of accuracy.

19. The method of claim 16, wherein detecting the potential spoofing event comprises receiving one or more signals from at least one of a network entity or a second UE in one or more basic safety messages (BSMs).

20. The method of claim 19, further comprising determining the confidence metric based on a comparison of at least one characteristic indicated by the one or more signals and a characteristic indicated by received location information.

21. The method of claim 16, wherein detecting the potential spoofing event comprises measuring, using at least one onboard sensor independent from the location information, a movement attribute of the source UE to examine a validity of the location information.

22. The method of claim 16, wherein the request further comprises at least one of:
a vehicle identifier,
destination information, or
a source positioning location.

23. The method of claim 16, wherein the request further indicates a travel preference parameter.

24. The method of claim 16, further comprising:
receiving a response indicating confirmation that the source UE is allowed to join a vehicle platoon assigned by the PCS;
receiving an invitation corresponding to the confirmation from a lead UE of a lead vehicle of the vehicle platoon; and
abstaining from transmitting vehicle-to-everything (V2X) messages upon receiving the response.

25. The method of claim 16, further comprising receiving an alert notice from the PCS when the PCS does not have an available vehicle platoon to assign, wherein the alert notice comprises alert messages requesting manual control.

26. A method for wireless communication by a network entity, comprising:
receiving, form a user equipment (UE), a request to join a vehicle platoon, wherein the request includes:
a confidence metric that indicates a probability that the UE has received spoofed location information; and
at least one of:
an occupancy parameter of a vehicle associated with the UE; or an autonomy level of a vehicle associated with the UE; and transmitting, to the UE, an assignment of the vehicle platoon for the UE to join based on the request.

* * * * *